US008199143B2

(12) United States Patent
Yamamoto et al.

(10) Patent No.: US 8,199,143 B2

(45) Date of Patent: Jun. 12, 2012

(54) DISPLAY APPARATUS, DRIVING METHOD FOR DISPLAY APPARATUS AND ELECTRONIC APPARATUS

(75) Inventors: Tetsuro Yamamoto, Kanagawa (JP); Katsuhide Uchino, Kanagawa (JP); Naobumi Toyomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 779 days.

(21) Appl. No.: 12/289,580

(22) Filed: Oct. 30, 2008

(65) Prior Publication Data

US 2009/0135174 A1 May 28, 2009

(30) Foreign Application Priority Data

Nov. 26, 2007 (JP) ................................. 2007-304616

(51) Int. Cl.
*G06F 3/038* (2006.01)

(52) U.S. Cl. ......................................... 345/213; 345/82

(58) Field of Classification Search .................. 345/213, 345/82, 77

See application file for complete search history.

(56) References Cited

U.S. PATENT DOCUMENTS

| | | | | |
|---|---|---|---|---|
| 6,900,784 | B2 * | 5/2005 | Tsuchida | 345/76 |
| 7,636,073 | B2 * | 12/2009 | Ono et al. | 345/76 |
| 7,948,456 | B2 * | 5/2011 | Yamashita et al. | 345/82 |

FOREIGN PATENT DOCUMENTS

| | | | |
|---|---|---|---|
| JP | 2003-255856 | A | 9/2003 |
| JP | 2003-271095 | A | 9/2003 |
| JP | 2004-029791 | A | 1/2004 |
| JP | 2004-093682 | A | 3/2004 |
| JP | 2004-133240 | A | 4/2004 |
| JP | 2006-215213 | | 8/2006 |

* cited by examiner

*Primary Examiner* — Amare Mengistu
*Assistant Examiner* — Towfiq Elahi
(74) *Attorney, Agent, or Firm* — Rader Fishman & Grauer, PLLC

(57) ABSTRACT

The present invention provides a display apparatus, includes: a pixel array section; and a driving section; the pixel array section including a plurality of scanning lines extending along the direction of a row, a plurality of signal lines extending along the direction of a column, and a plurality of pixels disposed in rows and columns at places at which the scanning lines and the signal lines intersect with each other. The driving section including a write scanner and a signal selector.

8 Claims, 22 Drawing Sheets

(1)

(2), (3)

(4)

(5)

(5a)

(6)

(7)

DISPLAY APPARATUS, DRIVING METHOD FOR DISPLAY APPARATUS AND ELECTRONIC APPARATUS

CROSS REFERENCES TO RELATED APPLICATIONS

The present invention contains subject matter related to Japanese Patent Application JP 2007-304616, filed in the Japan Patent Office on Nov. 26, 2007, the entire contents of which being incorporated herein by reference.

BACKGROUND OF THE INVENTION

1. Field of the Invention

This invention relates to a display apparatus of the active matrix type wherein a light emitting element is used in a pixel and a driving method for a display apparatus of the type described. The present invention relates also to an electronic apparatus which includes a display apparatus of the type described.

2. Description of the Related Art

In recent years, development of a display apparatus of the planar self-luminous type which uses an organic EL (electroluminescence) device as a light emitting element is proceeding energetically. The organic EL device utilizes a phenomenon that, if an electric field is applied to an organic thin film, then the organic thin film emits light. Since the organic EL device is driven by an application voltage lower than 10V, the power consumption of the same is low. Further, since the organic EL device is a self-luminous device which itself emits light, it requires no illuminating member and can be formed as a device of a reduced weight and a reduced thickness. Further, since the response speed of the organic EL device is approximately several us and very high, an after-image upon display of a dynamic picture does not appear.

Among display apparatuses of the flat self-luminous type wherein an organic EL device is used in a pixel, a display apparatus of the active matrix type wherein thin film transistors as active elements are formed in an integrated relationship in pixels is being developed energetically. A flat self-luminous display apparatus of the active matrix type is disclosed, for example, in Japanese Patent Laid-Open Nos. 2003-255856 (hereinafter referred to as Patent Document 1), 2003-271095 (hereinafter referred to as Patent Document 2), 2004-133240 (hereinafter referred to as Patent Document 3), 2004-029791 (hereinafter referred to as Patent Document 4) and 2004-093682 (hereinafter referred to as Patent Document 5) and 2006-215213 (hereinafter referred to as Patent Document 6).

FIG. 23 schematically shows an example of an existing active matrix display apparatus. Referring to FIG. 23, the display apparatus shown includes a pixel array section 1 and peripheral driving sections. The driving sections include a horizontal selector 3 and a write scanner 4. The pixel array section 1 includes a plurality of signal lines SL extending along the direction of a column and a plurality of scanning lines WS extending along the direction of a row. A pixel 2 is disposed at a place at which each of the signal lines SL and each of the scanning lines WS intersect with each other. In order to facilitate understandings, only one pixel 2 is shown in FIG. 23. The write scanner 4 includes a shift register which operates in response to a clock signal ck supplied thereto from the outside to successively transfer a start pulse sp supplied thereto similarly from the outside to output a sequential control signal to the scanning line WS. The horizontal selector 3 supplies an image signal to the signal line SL in synchronism with the line sequential scanning of the write scanner 4 side.

The pixel 2 includes a sampling transistor T1, a driving transistor T2, a storage capacitor C1 and a light emitting element EL (electroluminescence). The driving transistor T2 is of the P-channel type, and is connected at the source thereof, which is one of current terminals, to a power supply line and at the drain thereof, which is the other current terminal, to the light emitting element EL. The driving transistor T2 is connected at the gate thereof, which is a control terminal thereof, to the signal line SL through the sampling transistor T1. The sampling transistor T1 is rendered conducting in response to a control signal supplied thereto from the write scanner 4 and samples and writes an image signal supplied from the signal line SL into the storage capacitor C1. The driving transistor T2 receives, at the gate thereof, the image signal written in the storage capacitor C1 as a gate voltage Vgs and supplies drain current Ids to the light emitting element EL. Consequently, the light emitting element EL emits light with luminance corresponding to the image signal. The gate voltage Vgs represents a potential at the gate with reference to the source.

The driving transistor T2 operates in a saturation region, and the relationship between the gate voltage Vgs and the drain current Ids is represented by the following characteristic expression:

$$Ids=(1/2)\mu(W/L)Cox(Vgs-Vth)^2$$

where μ is the mobility of the driving transistor, W the channel width of the driving transistor, L the channel length of the driving transistor, Cox the gate insulating layer capacitance per unit area of the driving transistor, and Vth is the threshold voltage of the driving transistor. As can be apparently seen from the characteristic expression, when the driving transistor T2 operates in a saturation region, it functions as a constant current source which supplies the drain current Ids in response to the gate voltage Vgs.

FIG. 24 illustrates a voltage/current characteristic of the light emitting element EL. In FIG. 24, the axis of abscissa indicates the anode voltage V and the axis of ordinate indicates the drain current Ids. It is to be noted that the anode voltage of the light emitting element EL is the drain voltage of the driving transistor T2. The current/voltage characteristic of the light emitting element EL varies with time such that the characteristic curve thereof tends to become less steep as time passes. Therefore, even if the drain current Ids is fixed, the anode voltage or drain voltage V varies. In this regard, since the driving transistor T2 in the pixel 2 shown in FIG. 23 operates in a saturation region and can supply drain current Ids corresponding to the gate voltage Vgs irrespective of the variation of the drain voltage, the emission light luminance can be kept fixed irrespective of the time variation of the characteristic of the light emitting element EL.

FIG. 25 shows another example of an existing pixel circuit. Referring to FIG. 25, the pixel circuit shown is different from that described hereinabove with reference to FIG. 23 in that the driving transistor T2 is not of the P-channel type but of the N-channel type. From a fabrication process of a circuit, it is frequently advantageous to form all transistors which compose a pixel from N-channel transistors.

SUMMARY OF THE INVENTION

However, in the circuit configuration of FIG. 25, since the driving transistor T2 is of the N-channel type, it is connected at the drain thereof to a power supply line and at the source S thereof to the anode of the light emitting element EL. Accordingly, when the characteristic of the light emitting element EL varies with time, since an influence appears with the potential of the source S of the driving transistor T2, the gate voltage Vgs varies and the drain current Ids supplied by the driving transistor T2 varies as time passes. Therefore, the luminance of the light emitting element EL varies as time passes. Further, not only the luminance of the light emitting element EL but also the threshold voltage Vth and the mobility μ of the driving transistor T2 disperses for each pixel. Since the threshold voltage Vth and the mobility μ are included in the transistor characteristic expression given hereinabove, even if the gate voltage Vgs is fixed, the drain current Ids varies. Consequently, the emission light luminance disperses for each pixel, and uniformity of the screen image cannot be obtained. A display apparatus having a function of correcting the threshold voltage Vth of the driving transistor T2 which disperses for each pixel, that is, a threshold voltage correction function, has been proposed heretofore and is disclosed, for example, in Patent Document 3 mentioned hereinabove. Also a display apparatus which includes a function of correcting the mobility μ of the driving transistor T2, which disperses for each pixel, that is, which includes a threshold voltage correction function, has been proposed and is disclosed, for example, in Patent Document 6 mentioned hereinabove.

The existing display apparatus which includes the mobility correction function carries out mobility correction in conformity with a period within which the sampling transistor T1 is turned on to sample and write an image signal into the storage capacitor C1, that is, within a sampling period or a writing period. In particular, within the sampling period, driving current flowing through the driving transistor T2 is negatively fed back to the storage capacitor C1 in response to the image signal thereby to apply correction for the mobility μ of the driving transistor T1 to the signal potential of the image signal written in the storage capacitor C1. Accordingly, the sampling period just becomes a mobility correction period.

The signal potential of the image signal varies in response to the gradation from the black level to the white level. Meanwhile, in the existing display apparatus, the sampling period of the image signal, that is, the mobility correction period, is fixed irrespective of the gradation level of the image signal. However, it is known that the optimum mobility correction period is not necessarily fixed but relies upon the gradation level of the image signal. As a general tendency, when the luminance exhibits the white level, the optimum mobility correction period is short, but when the luminance exhibits the black level, the optimum mobility correction period is long. However, the existing display apparatus does not include a countermeasure in this regard and cannot carry out accurate and complete mobility correction, and therefore has a subject to be solved in that the uniformity of the screen image is not always high.

According to an embodiment of the present invention, there is provided a display apparatus includes a pixel array section, and a driving section, the pixel array section including a plurality of scanning lines extending along the direction of a row, a plurality of signal lines extending along the direction of a column, and a plurality of pixels disposed in rows and columns at places at which the scanning lines and the signal lines intersect with each other. Each of the pixels including a sampling transistor, a driving transistor, a storage capacitor and a light emitting element, the sampling transistor being connected at a control terminal thereof to an associated one of the scanning lines and at a pair of current terminals thereof to a first one of the signal lines and a control terminal of the driving transistor. The driving transistor being connected at a first one of a pair of current terminals thereof to the light emitting element and at a second one of the current terminals thereof to a power supply, the storage capacitor being connected to the control terminal of the driving transistor, the driving section including a write scanner and a signal selector, the write scanner supplying sequential control signals to the scanning lines for each horizontal period, the signal selector supplying image signals, wherein a signal potential and a reference potential change over for each horizontal period, to the signal lines. The sampling transistor being placed into an on state in response to a control signal supplied to an associated one of the scanning lines when an associated one of the signal lines has the reference potential to carry out a threshold voltage correction operation of canceling a dispersion of the threshold voltage of the driving transistor. The sampling transistor carrying out a signal writing operation of writing, within a writing period from a first timing at which the potential of the associated signal line changes over from the reference potential to the signal potential to a second timing at which the sampling transistor is placed into an off state in response to the control signal, the signal potential into the storage capacitor, the driving transistor supplying driving current in accordance with the signal potential written in the storage capacitor to the light emitting element so as to carry out a light emitting operation. The signal selector variably adjusting the first timing in response to the signal potential thereby to variably control the writing period from the first timing to the second timing in response to the signal potential.

In particular, the display apparatus may be configured such that, when the signal potential has a white level, the signal selector displaces the first timing toward the second timing to shorten the writing period, but when the signal potential has a black level, the signal selector displaces the first timing away from the second timing to elongate the writing period. In this instance, the display apparatus may be configured such that the storage capacitor is connected between the control terminal and one of the current terminals of the driving transistor, and the driving transistor negatively feeds back driving current flowing therethrough during the writing period to the storage capacitor to carry out a correction operation against a dispersion of the mobility of the driving transistor whereas the signal selector variably adjusts the writing period in response to the signal potential to optimize the negative feedback amount.

In the display apparatus, within the writing period from the first timing at which the potential of the signal line changes over from the reference potential to the signal potential to the second timing at which the sampling transistor is placed into an off state in response to the control signal, the signal potential is written into the storage capacitor. Thereupon, the signal selector variably controls the first timing in response to the signal potential thereby to variably control the writing period from the first timing to the second timing. Within this writing period, the driving current flowing through the driving transistor is negatively fed back to the storage capacitor to carry out correction against the dispersion of the mobility of the driving transistor. Therefore, the writing period from the first timing to the second timing serves as the mobility correction period. In the present embodiment, this writing period, that is, the mobility correction period, is adaptively adjusted in response to the signal potential. Consequently, optimum control of the mobility correction period in accordance with the level or gradation of the signal potential can be achieved, and uniformity of the screen image can be enhanced.

DETAILED DESCRIPTION OF THE PREFERRED EMBODIMENT

Figure 1:
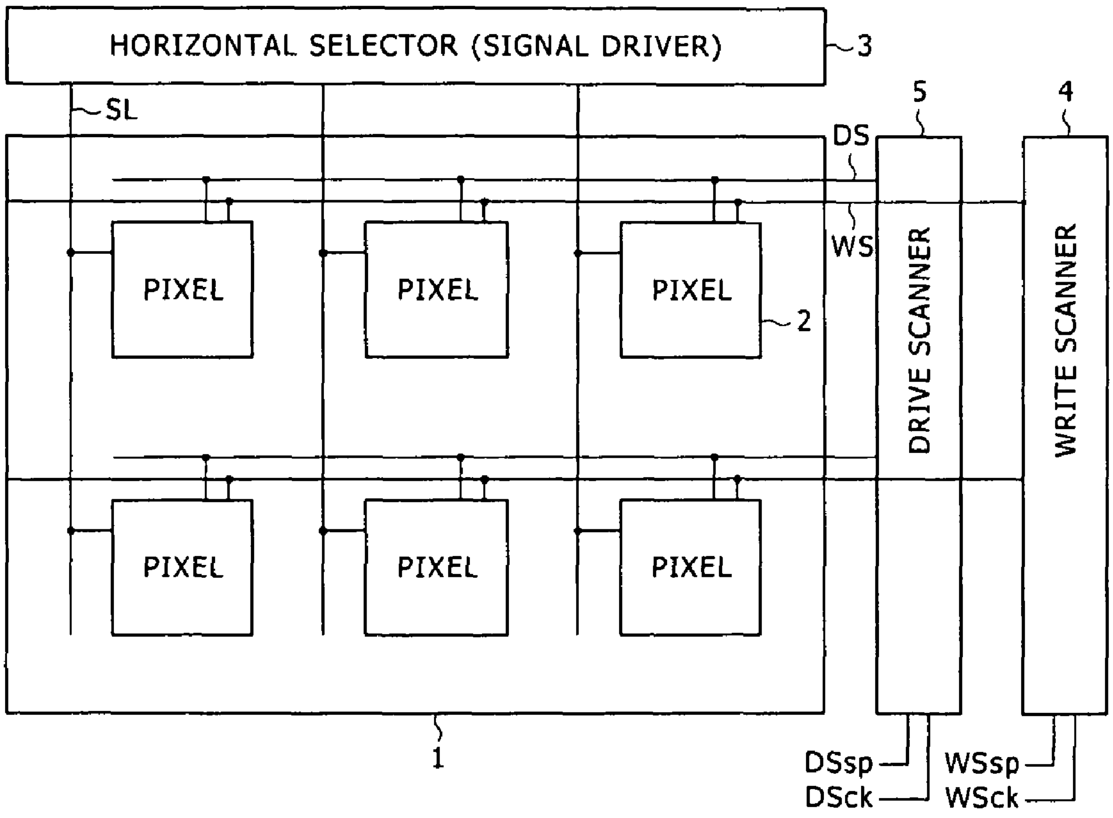
FIG. 1 is a block diagram showing a general configuration of a display apparatus according to the present invention.

The preferred embodiment of the present invention will now be described in reference to the accompanying drawings. In the FIG. 1, there is shown a general configuration of a display apparatus according to the embodiment. The display apparatus shown is formed from a panel wherein a pixel array section 1 and driving sections (3, 4 and 5) for driving the pixel array section 1 are formed on the same substrate. The pixel array section 1 includes a plurality of scanning lines WS extending along the direction of a row, a plurality of signal lines SL extending along the direction of a column, a plurality of pixels 2 disposed in rows and columns at places at which the scanning lines WS and the signal lines SL intersect with each other, and a plurality of feed lines DS serving as power supply lines disposed corresponding to the rows of the pixels 2. The driving sections 3, 4 and 5 include a controlling scanner (write scanner) 4 for successively supplying a control signal to the scanning lines WS to line-sequentially scan the pixels 2 in a unit of a row, a power supply scanner (drive scanner) 5 for supplying a power supply potential which is changed over between a first potential and a second potential to each of the feed lines DS in response to the line-sequential scanning, and a signal driver (horizontal selector) 3 for supplying a signal potential serving as an image signal and a reference potential to the signal lines SL in the columns in response to the line-sequential scanning. It is to be noted that the controlling scanner or write scanner 4 operates in response to a clock signal WSck supplied thereto from the outside to successively transfer a start pulse WSsp supplied similarly from the outside to output a control signal to the scanning lines WS. The power supply scanner or drive scanner 5 operates in response to a clock signal DSck supplied from the outside to successively transfer a start pulse DSsp supplied similarly from the outside to line-sequentially change over the potential of the feed lines DS.

Figure 2:
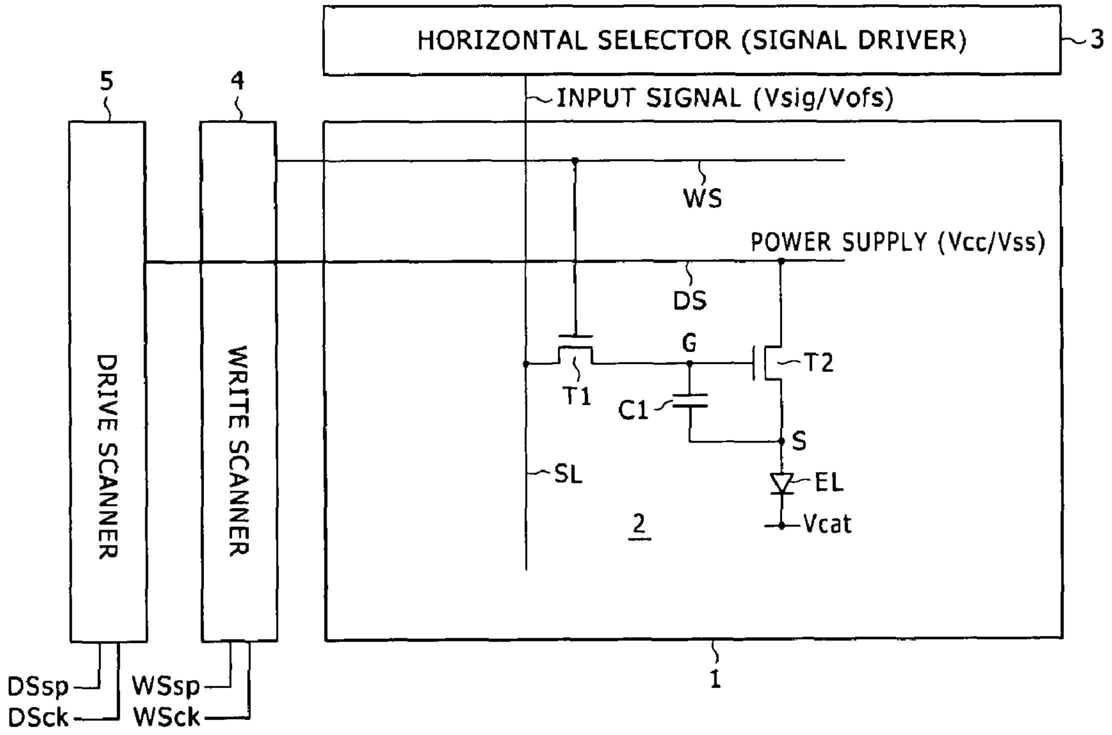
FIG. 2 is a circuit diagram showing an example of a pixel formed in the display apparatus shown in FIG. 1.

FIG. 2 shows a particular configuration of the pixels 2 included in the display apparatus shown in FIG. 1. Referring to FIG. 2, each pixel 2 includes a light emitting element EL of the two-terminal type or diode type represented by an organic EL device, a sampling transistor T1 of the N-channel type, a driving transistor T2 of the N-channel type, and a storage capacitor C1 of the thin film type. The sampling transistor T1 is connected at the gate thereof, which serves as a control terminal, to a scanning line WS, at one of the source and the drain thereof, which serve as current terminals, to the gate G of the driving transistor T2, and at the other one of the source and the drain thereof to a signal line SL. The driving transistor T2 is connected at one of the source and the drain thereof to the light emitting element EL and at the other one of the source and the drain thereof to a feed line DS. In the present embodiment, the driving transistor T2 is of the N-channel type and is connected at the drain side thereof, which is one of the current terminals, to the feed line DS and at the source S side thereof, which is the other current terminal, to the anode side of the light emitting element EL. The light emitting element EL is connected at the cathode thereof and fixed to a predetermined cathode potential Vcat. The storage capacitor C1 is connected between the source S as the current terminal and the gate G as the control terminal of the driving transistor T2. The controlling scanner or write scanner 4 changes over the potential to the scanning line WS between the low potential and the high potential to output a sequential control signal to the pixels 2 having such a configuration as described above thereby to line-sequentially scan the pixels 2 in a unit of a row. The power supply scanner or driver scanner 5 supplies a power supply potential, which changes over between a first potential Vcc and a second potential Vss to the feed lines DS in response to the line-sequential scanning. The signal driver or horizontal selector 3 supplies a signal potential Vsig, which is an image signal, and a reference potential Vofs to the signal lines SL extending in the column direction in synchronism with the line-sequential scanning.

Figure 3:
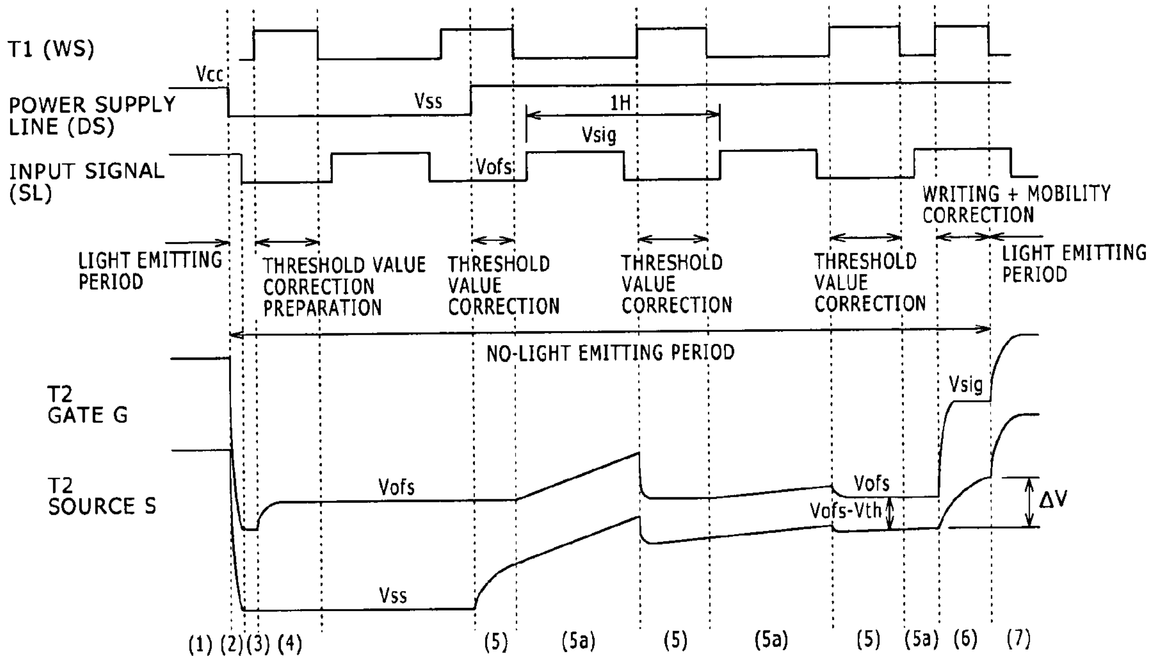
FIG. 3 is a timing chart illustrating a reference example of operation of the pixel shown in FIG. 2.

FIG. 3 illustrates operation of the pixel shown in FIG. 2. It is to be noted that the operation illustrated in FIG. 3 is a reference example, and the operation of the pixel circuit shown in FIG. 2 is not limited to that illustrated in FIG. 3. The timing chart of FIG. 3 illustrates the potential variation of the scanning line WS, the potential variation of the feed line or power supply line DS and the potential variation of the signal line SL with respect to the common time axis. The potential variation of the scanning line WS represents the control signal and controls the sampling transistor T1 between open and closed state. The potential variation of the feed line DS represents changeover between the power supply voltages Vcc and Vss. The potential variation of the signal line SL represents changeover between the signal potential Vsig and the reference potential Vofs of the input signal or image signal. This changeover is carried out within each horizontal period of 1 H. In parallel to the potential variations mentioned, also the potential variations of the gate G and the source S of the driving transistor T2 are illustrated. The potential difference Vgs is the potential difference between the gate G and the source S as described hereinabove.

The period of the timing chart of FIG. 3 is divided into (1) to (7) periods in accordance with the transition of the operation of the pixel for the convenience of description. Within the period (1) immediately prior to the pertaining field, the light emitting element EL is in a light emitting state. Thereafter, the new field of the line-sequential scanning is entered, and within the first period (2), the potential of the feed line DS is changed over from the first potential Vcc to the second potential Vss. Then, within the next period (3), the input signal is changed over from the signal potential Vsig to the reference potential Vofs. Further, within the period (4), the sampling transistor T1 is turned on. Within the periods (2) to (4), the gate voltage and the source voltage of the driving transistor T2 are initialized. The periods (2) to (4) are a preparation period for threshold voltage correction, within which the gate G of the driving transistor T2 is initialized to the reference potential Vofs and the source S of the driving transistor T2 is initialized to the second potential Vss. Then, within the period (5), a threshold voltage correction operation is carried out actually, and a voltage corresponding to the threshold voltage Vth is stored between the gate G and the source S of the driving transistor T2. Actually, the voltage corresponding to the threshold voltage Vth is written into the storage capacitor C1 connected between the gate G and the source S of the driving transistor T2.

It is to be noted that, in the reference example of FIG. 3, the threshold correction period (5) is provided three times, and a waiting period (5a) is inserted next to each of the threshold correction periods (5). By dividing the threshold voltage correction period (5) to repeat the threshold voltage correction operation by a plural number of times, a voltage corresponding to the threshold voltage Vth is written into the storage capacitor C1. It is to be noted, however, that the present invention is not limited to this, but the correction operation may be carried out within one threshold voltage correction period (5).

Thereafter, the writing operation period/mobility correction period (6) is entered. Here, the signal potential Vsig of the image signal is written in an accumulated manner into the storage capacitor C1 while a voltage ΔV for mobility correction is subtracted from the voltage stored in the storage capacitor C1. Within the writing operation period/mobility correction period (6), it is necessary to place the sampling transistor T1 into a conducting state within a time zone within which the signal line SL remains having the signal potential Vsig. Thereafter, the light emitting period (7) is entered, and the light emitting element emits light with a luminance corresponding to the signal potential Vsig. Thereupon, since the signal potential Vsig is adjusted with the voltage corresponding to the threshold voltage Vth and the voltage ΔV for mobility correction, the emission light luminance of the light emitting element EL is not influenced by the dispersion of the threshold voltage Vth or the mobility μ of the driving transistor T2. It is to be noted that a bootstrap operation is carried out at the beginning of the light emitting period (7), and while the gate-source voltage Vgs of the driving transistor T2 is kept fixed, the gate potential and the source potential of the driving transistor T2 rise.

Figure 4:
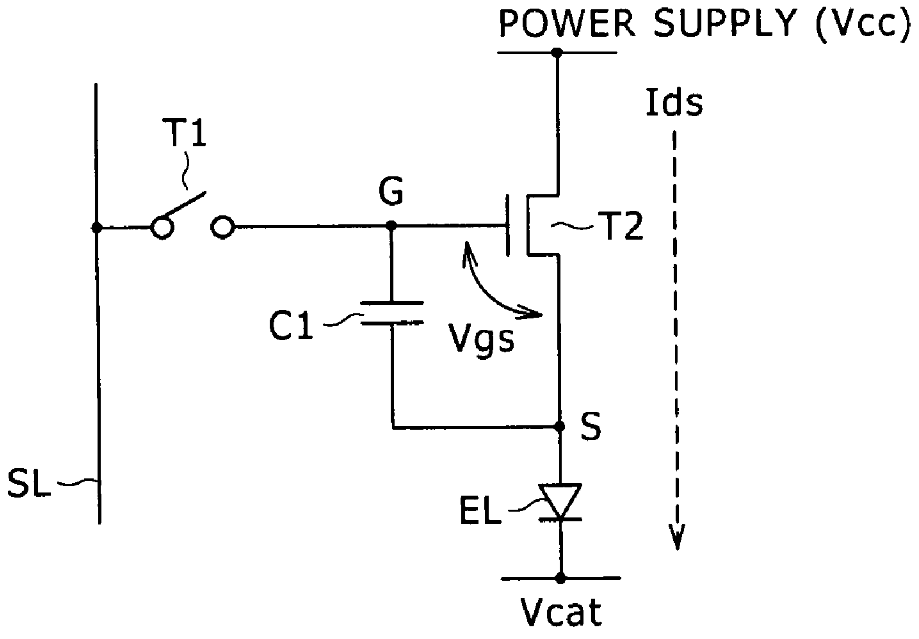
FIGS. 4, 5, 6 and 7 are circuit diagrams illustrating operations of the pixel shown in FIG. 2.

Operation of the pixel circuit shown in FIG. 2 is described in detail with reference to FIGS. 4 to 12. First, within the light emitting period (1), as seen in FIG. 4, the power supply potential is set to the first potential Vcc and the sampling transistor T1 is in an off state. At this times, since the driving transistor T2 is set so as to operate in a saturation region, the driving current Ids flowing through the light emitting element EL assumes a value given by the transistor characteristic expression mentioned hereinabove in response to the gate-source voltage Vgs applied between the gate G and the source S of the driving transistor T2.

Figure 5:
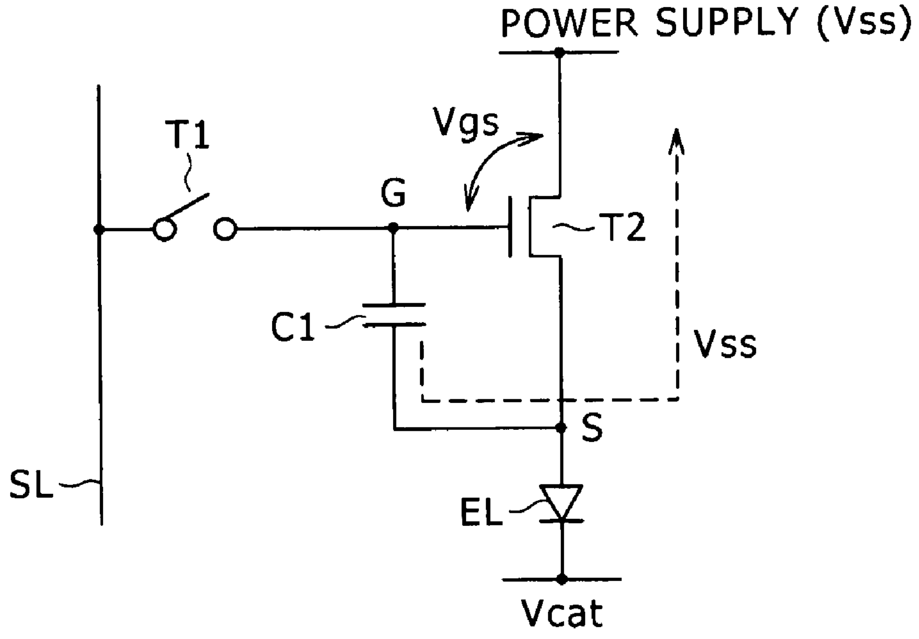
Figure 6:
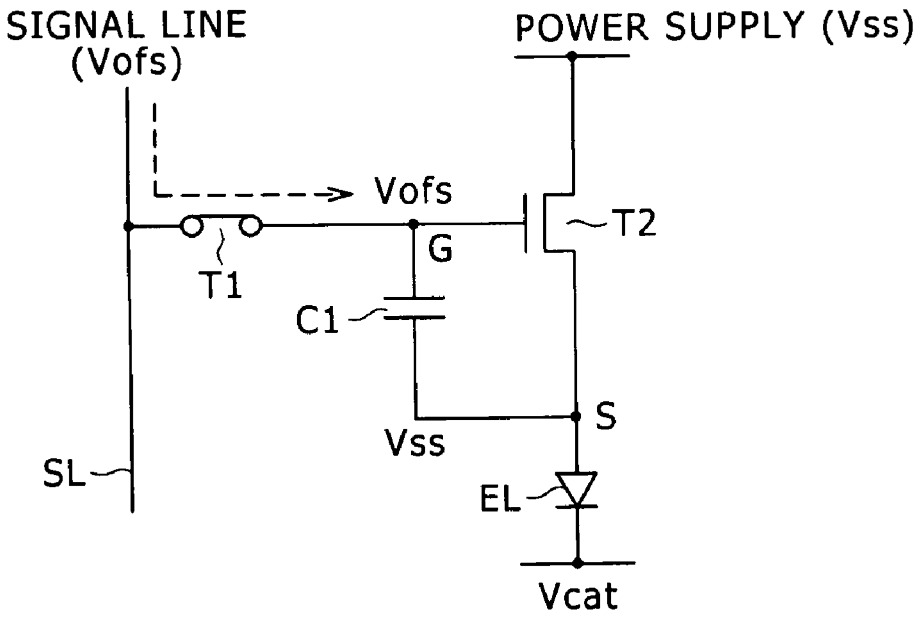

Accordingly, after the preparation period (2) and (3) is entered, the potential of the feed line or power supply line DS is changed to the second potential Vss as seen in FIG. 5. Since the second potential Vss is set such that the driving transistor T2 operates in a saturation region at this time, the light emitting element EL is turned off and the power supply line side becomes the source of the driving transistor T2. At this time, the anode of the light emitting element EL is charged to the second potential Vss.

Figure 7:
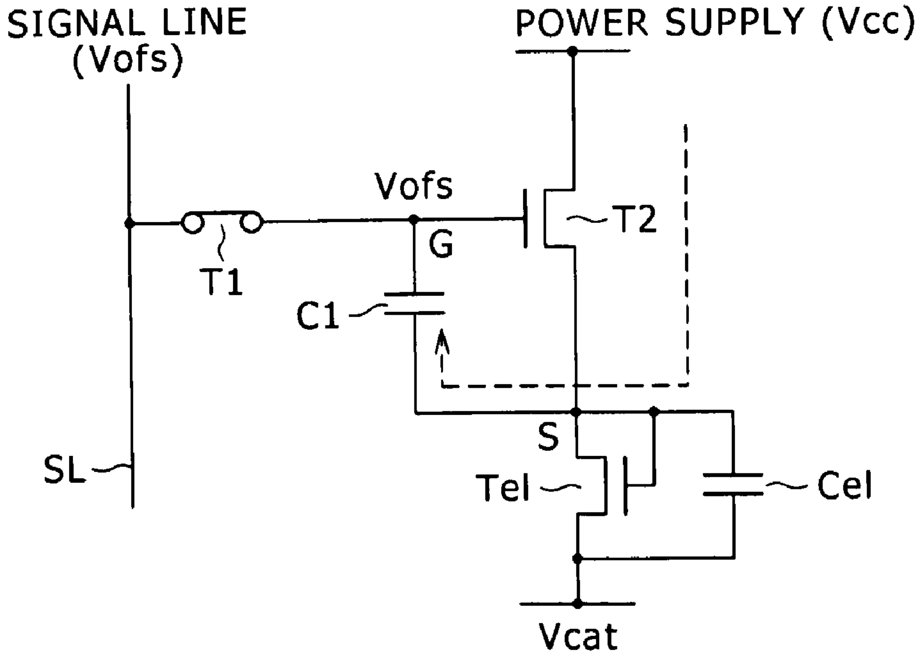

Then, after the next preparation period (4) is entered, while the potential of the signal line SL becomes the reference potential Vofs, the sampling transistor T1 is turned on to set the gate potential of the driving transistor T2 to the reference potential Vofs as seen in FIG. 7. The source S and the gate G of the driving transistor T2 upon light emission are initialized in this manner, and the gate-source voltage Vgs at this time becomes the value of Vofs−Vss. The gate-source voltage Vgs=Vofs−Vss is set so as to have a value higher than the threshold voltage Vth of the driving transistor T2. By initializing the driving transistor T2 such that Vgs>Vth is satisfied in this manner, preparations for a succeeding threshold voltage correction operation are completed.

Then, after the threshold voltage correction period (5) is entered, the potential of the feed line DS returns to the first potential Vcc as seen in FIG. 7. When the power supply voltage becomes the first potential Vcc, the potential of the anode of the light emitting element EL becomes the potential of the source S of the driving transistor T2, and current flows as indicated by a broken line arrow mark in FIG. 7. At this time, the equivalent circuit of the light emitting element EL is represented by a parallel connection of a diode Tel and a capacitor Cel. Since the anode potential of the light emitting element EL, that is, the second potential Vss, is lower than Vcat+Vthel, the diode Tel is in an off state, and leak current flowing through the diode Tel is considerably smaller than the current flowing through the driving transistor T2. Therefore, almost all of the current flowing through the driving transistor T2 is used to charge up the storage capacitor C1 and the equivalent capacitor Cel.

Figure 8:
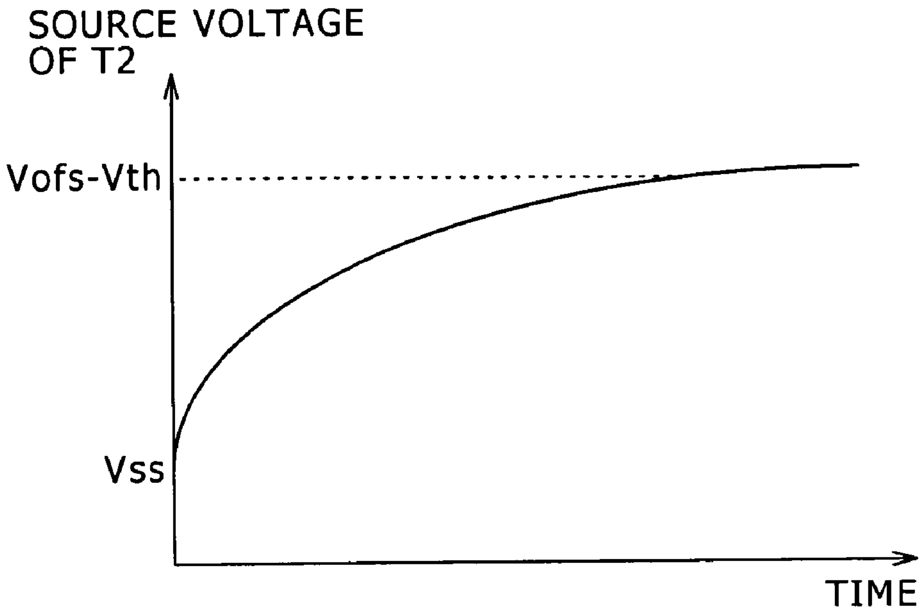
FIG. 8 is a graph illustrating the operation illustrated in FIG. 7.

FIG. 8 illustrates a time variation of the source potential of the driving transistor T2 within the threshold voltage correction period (5) illustrated in FIG. 7. Referring to FIG. 8, the source voltage of the driving transistor T2, that is, the anode voltage of the light emitting element EL, rises from the second potential Vss as time passes. After the threshold voltage correction period (5) passes, the driving transistor T2 is cut off, and the gate-source voltage Vgs between the source S and the gate G of the driving transistor T2 becomes equal to the threshold voltage Vth. At this time, the source potential is given by Vofs−Vth. If this value Vofs−Vth still remains lower than Vcat+Vthel, then the light emitting element EL is in a cutoff state.

Figure 9:
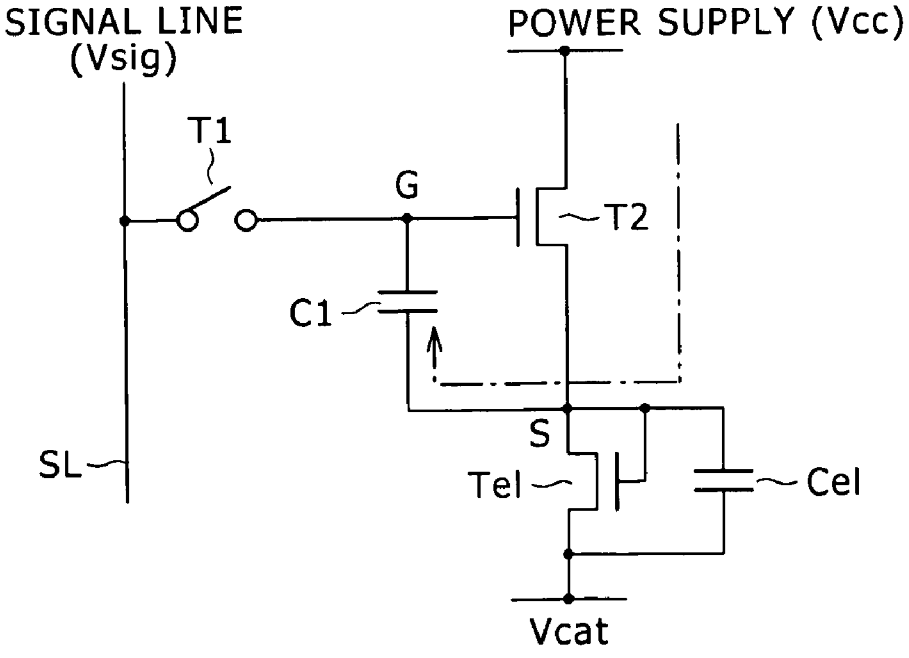
FIGS. 9 and 10 are circuit diagrams illustrating operations of the pixel shown in FIG. 2.

As seen from FIG. 8, the source potential of the driving transistor T2 rises as time passes. However, in the present example, before the source voltage of the driving transistor T2 reaches Vofs−Vth, the first time threshold voltage correction period (5) comes to an end, and therefore, the sampling transistor T1 is turned off and the waiting period (5a) is entered. FIG. 9 illustrates a state of the pixel circuit within this waiting period (5a). Within this first time waiting period (5a), since the gate-source voltage Vgs of the driving transistor T2 still remains higher than the threshold voltage Vth, current flows from the first potential Vcc to the storage capacitor C1 through the driving transistor T2 as seen in FIG. 9. Consequently, although the source voltage of the driving transistor T2 rises, since the sampling transistor T1 is in an off state and the gate G of the driving transistor T2 is in a high impedance state, also the potential of the gate G of the driving transistor T2 rises together with the potential rise of the source S. In other words, within the first-time waiting period (5a), both of the source potential and the gate potential of the driving transistor T2 rise. At this time, since the reverse bias continues to be applied to the light emitting element EL, the light emitting element EL emits no light.

Thereafter, when one horizontal period of 1 H passes and the potential of the signal line SL becomes the reference potential Vofs, the sampling transistor T1 is turned on to start the second time threshold voltage correction operation. Thereafter, when the second time threshold voltage correction period (5) elapses, the second time waiting period (5a) is entered. By repeating the threshold voltage correction period (5) and the waiting period (5a) in this manner, the gate-source voltage Vgs of the driving transistor T2 finally reaches a voltage corresponding to the threshold voltage Vth. At this time, the source potential of the driving transistor T2 is Vofs−Vth and is lower than Vcat+Vthel.

Figure 10:
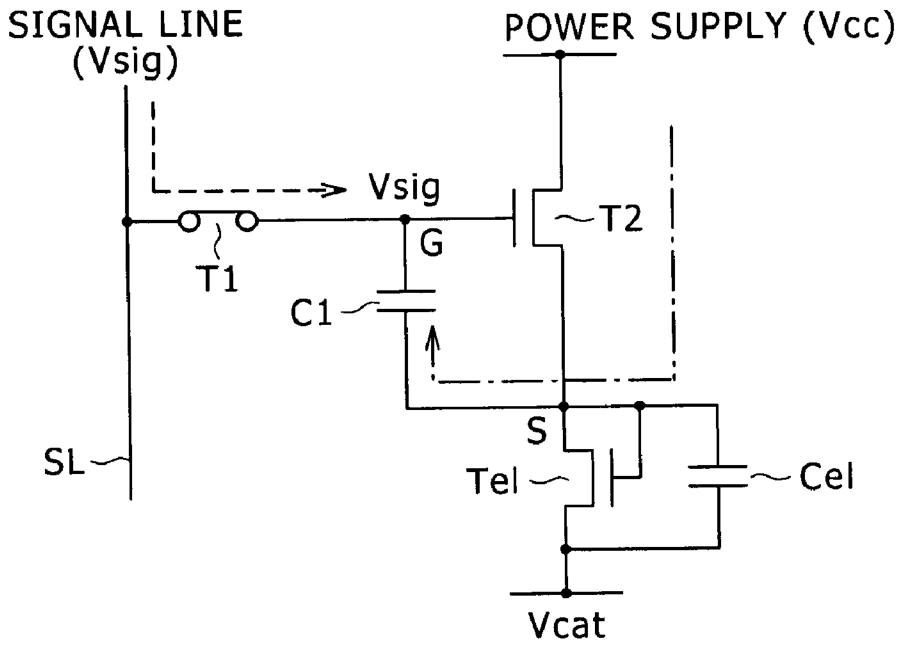

Thereafter, when the writing operation period/mobility correction period (6) is entered, the potential of the signal line SL is changed over from the reference potential Vofs to the signal potential Vsig and then the sampling transistor T1 is turned on as seen in FIG. 10. At this time, the signal potential Vsig has a voltage value according to a gradation. Since the sampling transistor T1 is on, the gate potential of the driving transistor T2 becomes the signal potential Vsig. Meanwhile, the source potential of the driving transistor T2 rises as time passes because current flows therethrough from the first potential Vcc. Also at this time, if the source potential of the driving transistor T2 does not exceed the sum of the threshold voltage Vthel of the light emitting element EL and the cathode potential Vcat, then the current flowing from the driving transistor T2 is used only for charging of the capacitor equivalent Cel and the storage capacitor C1. At this time, since the threshold voltage correction operation of the driving transistor T2 has been completed already, the current supplied from the driving transistor T2 reflects the mobility μ. Particularly, where the driving transistor T2 has a high mobility μ, the current amount at this time is great and also the potential rise amount ΔV of the source is great. On the contrary, where the driving transistor T2 has a low mobility μ, the current amount of the driving transistor T2 is small and the potential rise amount ΔV of the source is small. By such operation, the gate-source voltage Vgs of the driving transistor T2 is compressed by the potential rise amount ΔV reflecting the mobility μ, and at a point of time at which the mobility correction period (6) comes to an end, the gate-source voltage Vgs from which the mobility μ is eliminated completely is obtained.

Figure 11:
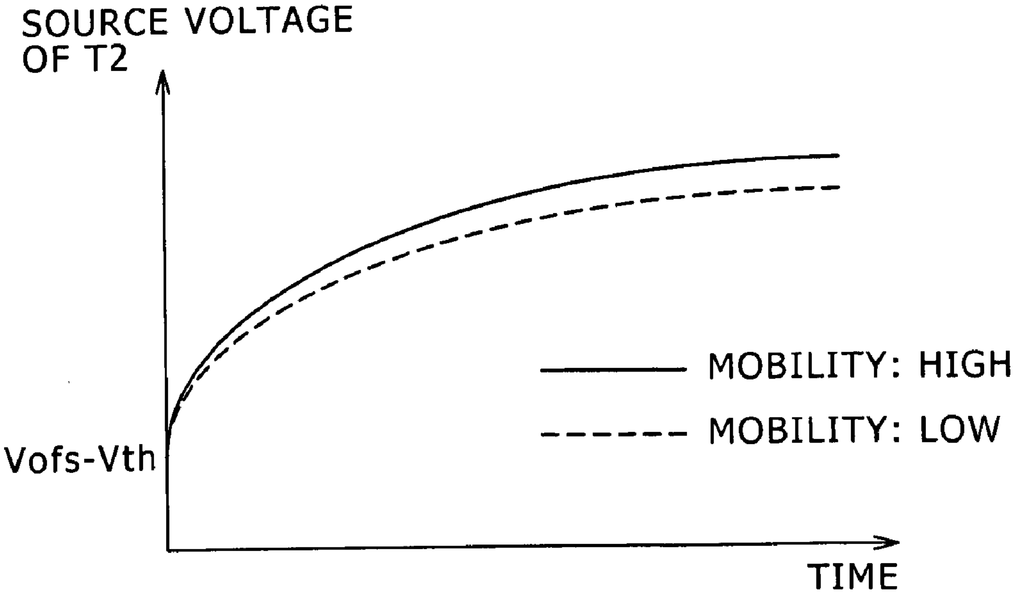
FIG. 11 is a graph illustrating the operation illustrated in FIG. 10.

FIG. 11 illustrates a variation with respect to time of the source potential of the driving transistor T2 within the mobility correction period (6) described above. As seen from FIG. 11, where the mobility of the driving transistor T2 is high, the source voltage of the driving transistor T2 rises quickly and the gate-source voltage Vgs is compressed as much. In other words, where the mobility μ is high, the gate-source voltage Vgs is compressed so as to cancel the influence of the mobility μ, and the driving current can be suppressed. On the other hand, where the mobility μ is low, the source voltage of the driving transistor T2 does not rise very quickly, and also the gate-source voltage Vgs is not compressed very strongly. Accordingly, where the mobility μ is low, the gate-source voltage Vgs is not compressed very much so as to supplement the low driving capacity.

Figure 12:
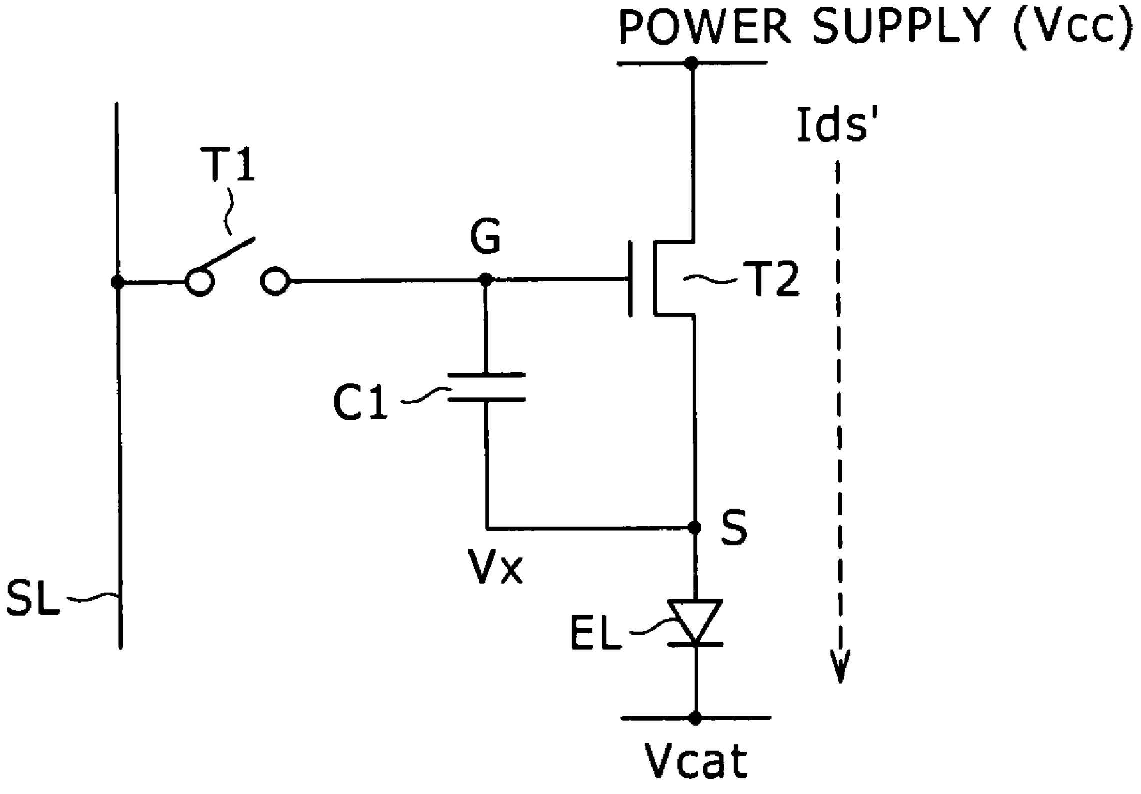
FIG. 12 is a circuit diagram illustrating an operation of the pixel shown in FIG. 2.

FIG. 12 illustrates an operation state within the light emitting period (7). Within the light emitting period (7), the sampling transistor T1 is turned off to cause the light emitting element EL to emit light. The gate voltage Vgs of the driving transistor T2 is kept fixed and the driving transistor T2 supplies fixed driving current Ids in accordance with the characteristic expression given hereinabove to the light emitting element EL. Since driving current Ids' flows through the light emitting element EL, the anode voltage of the light emitting element EL, that is, the source voltage of the driving transistor T2, rises up to Vx, and at a point of time at which the voltage exceeds Vcat+Vthel, the light emitting element EL emits light. As the light emission time becomes long, the current/voltage of the light emitting element EL varies. As a result, the potential of source S varies as shown in FIG. 11. However, since the gate-source voltage Vgs of the driving transistor T2 is kept at a fixed value by the bootstrap operation, the driving current Ids' flowing through the light emitting element EL does not vary. Therefore, even if the current/voltage characteristic of the light emitting element EL deteriorates, the fixed driving current Ids' require flows, and the luminance of the light emitting element EL does not vary at all.

Incidentally, the optimum mobility correction period is not necessarily fixed but relies upon the luminance level or gradation of the image signal. In order to eliminate unevenness of the screen image arising from the mobility, it is necessary to adaptively control the mobility correction period in response to the gradation level. As a general tendency, upon white display, the optimum mobility correction period is short, but conversely upon black display, the optimum mobility correction period is long.

Figure 13:
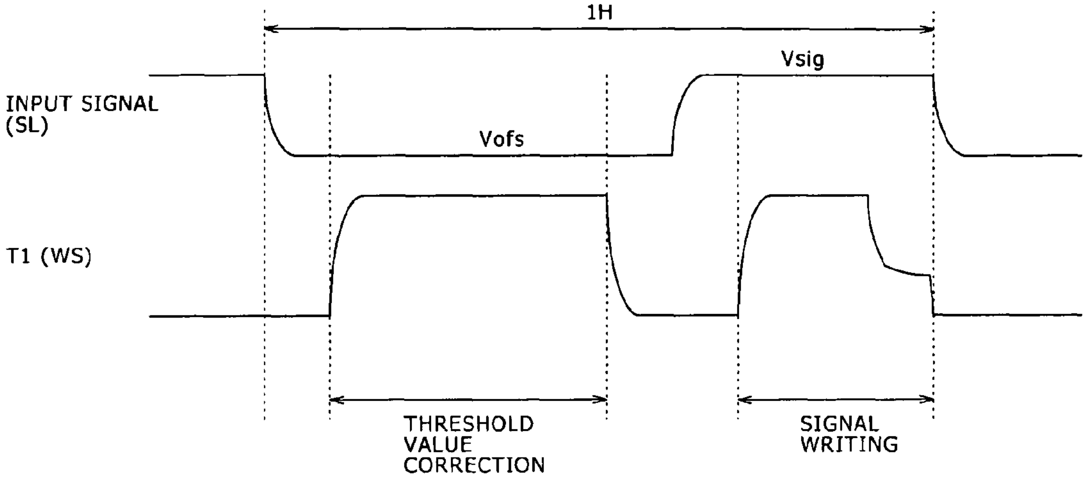
FIG. 13 is a timing chart illustrating operation of the pixel shown in FIG. 2.

FIG. 13 illustrates an adaptive control method of the mobility correction time or signal writing time in accordance with the gradation level. It is to be noted that FIG. 13 illustrates a reference example. Referring to FIG. 13, the input signal, that is, the image signal, to be supplied to a signal line SL is changed over between the reference potential Vofs and the signal potential Vsig within a period of 1 H. In response to the changeover, a control signal pulse is applied to the scanning line WS, and the sampling transistor T1 is placed into an on state twice. First, when the input signal has the reference potential Vofs, the sampling transistor T1 is placed into an on state to carry out a threshold value correction operation as described above. Then, when the potential of the input signal changes to the signal potential Vsig, the sampling transistor T1 is placed into an on state again to carry out a signal writing operation. The period within which this signal writing operation is carried out just becomes a mobility correction period. In the reference example of FIG. 13, a gradient is provided to a falling edge of the second time control signal pulse to carry out adaptive control of the signal writing period, that is, the mobility correction period. The falling edge waveform of the control signal pulse is an analog waveform and has a great voltage width, and therefore, cannot be produced in the inside of the panel but is produced utilizing an externally provided module. A desired falling edge waveform is produced by the module and inputted to the power supply line of the write scanner in the panel to obtain a control signal pulse having a desired falling edge waveform. However, since this module produces a waveform of a high degree of accuracy using a high potential, it is complicated and expensive and high power consumption is required. Therefore, use of an external module makes a considerable obstacle where the display apparatus is applied for display of a portable apparatus.

Figure 14:
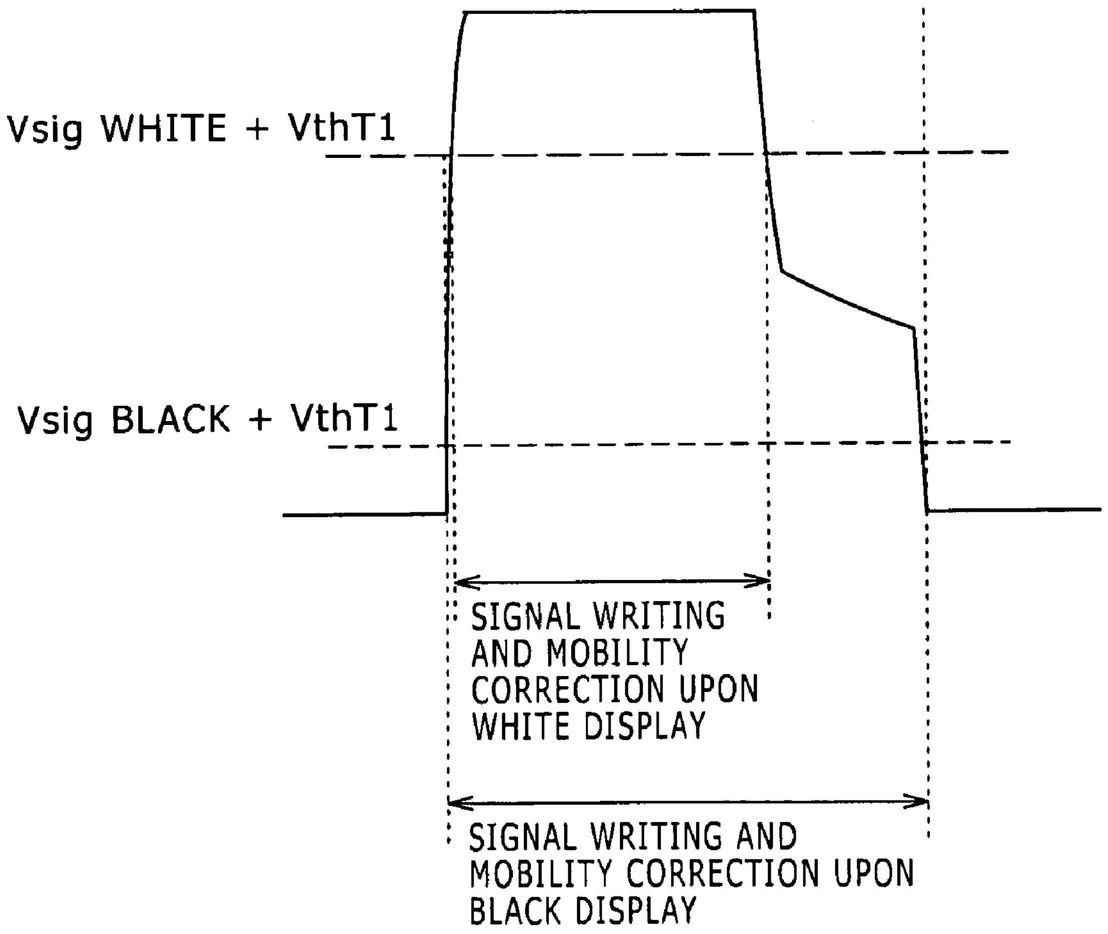
FIG. 14 is a waveform diagram illustrating operation of the pixel shown in FIG. 2.

FIG. 14 illustrates the adaptive control of the mobility correction period in the reference example of FIG. 13. As described above, the control signal pulse supplied to the scanning line WS has a characteristic falling edge waveform which first exhibits a steep slope and then exhibits a moderate variation and finally exhibits a steeply falling down slope. This falling edge waveform is applied to the control terminal, that is, to the gate, of the sampling transistor T1. Meanwhile, the signal potential Vsig is applied to the source of the sampling transistor T1. Accordingly, the gate voltage Vgs which controls on/off of the sampling transistor T1 relies upon the signal potential Vsig applied to the source of the sampling transistor T1.

Where the signal potential upon white display is represented by Vsig white and the threshold voltage of the sampling transistor T1 is represented by VthT1, when the falling edge of the control signal pulse just crosses the level of Vsig white+VthT1 indicated by a chain line, the sampling transistor T1 is placed into an off state. Since the timing at which the sampling transistor T1 is placed into an off state is just a point of time at which the control signal pulse begins to fall steeply, the white display signal writing period after the sampling transistor T1 is placed into an on state until it is placed into an off state becomes short. Therefore, also the mobility correction period upon white display becomes short.

On the other hand, where the signal potential upon black display is represented by Vsig black, the sampling transistor T1 is placed into an off state when the control signal pulse becomes lower at the last falling edge portion thereof than Vsig black+VthT1 indicated by a broken line. Therefore, the signal writing period upon black display becomes long. Adaptive control of the mobility correction period in accordance with the signal potential is carried out in this manner. It is to be noted that, in the case of gray display intermediate between white display and black display, the timing at which the sampling transistor T1 is placed into an off state is a portion of the falling edge waveform at which it just exhibits a moderate variation, and fine adjustment of the mobility correction waveform in accordance with the gray level can be carried out here. It is to be noted that, as described above, this reference example requires an external module in order to produce a characteristic falling edge waveform and has a problem in mobile applications and so forth.

Figure 15A:
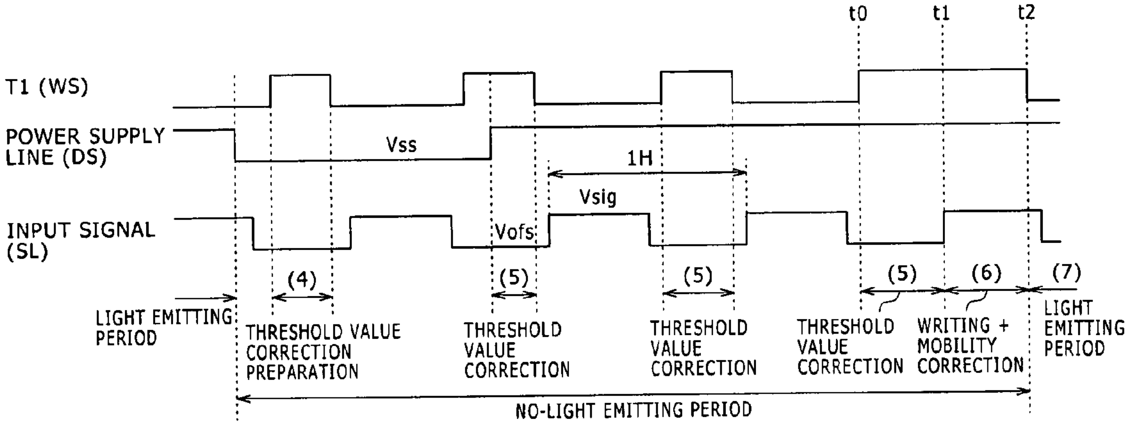
FIG. 15A is a waveform diagram illustrating operation of the display apparatus shown in FIG. 1.

In order to cope with such a problem of the reference example as just described, according to the embodiment, the falling edge phase of the image signal, that is, the timing at which the image signal or input signal inputted to a pixel changes over from a reference potential to a signal potential, is adjusted in response to the gradation level of the image signal to carry out adaptive control of the optimum mobility correction time. FIG. 15A illustrates a driving sequence according to the embodiment. Referring to FIG. 15A, the timing chart of FIG. 15A is basically same as the timing chart of the reference example shown in FIG. 3, and it adopts same representations in order to facilitate understandings. A control signal is supplied from the write scanner to the scanning line WS, and the sampling transistor T1 is placed into on and off states in response to the control signal. The write scanner supplies sequential control signals to the scanning lines WS for each one horizontal period (1 H). Meanwhile, an input signal is supplied from the signal selector to each signal line SL. The signal selector supplies an image signal or an input signal, which exhibits changeover between the signal potential Vsig and the reference potential Vofs within each horizontal period, to each signal line SL. To each power supply line DS, a power supply potential which exhibits changeover between the low potential Vss and the high potential Vcc is supplied from the power supply scanner.

As seen in FIG. 15A, when the power supply line or feed line DS is at the low potential Vss, each pixel carries out a threshold value correction preparation operation within a preparation period (4). Then, when the potential of the power supply line DS changes over from the low potential Vss to the high potential Vcc, a threshold value correction operation is carried out within a correction period (5). In the present embodiment, this threshold value correction operation is carried out time-divisionally three times.

Within the last period of 1 H within a no-light emitting period, a third threshold voltage correction period (5) and a signal writing period, that is, a mobility correction period (6), are included. Thereafter it enters to a light emitting period (7). Here, if attention is paid to the last 1 H period within the no-light emitting period, then the sampling transistor T1 is placed into an on state in response to the control signal supplied to the scanning line WS at timing t0 at which the signal line SL has the reference potential Vofs to carry out the third-time threshold voltage correction operation for canceling the dispersion of the threshold voltage Vth of the driving transistor T2. Thereafter, within the writing period (6) from the first timing t1 at which the potential of the signal line SL changes over from the reference potential Vofs to the signal potential Vsig to the second timing at which the sampling transistor T1 is placed into an off state in response to the control signal, a signal writing operation of writing the signal potential Vsig into the storage capacitor C1 is carried out. Thereafter, within a light emitting period (7), the driving transistor T2 supplies driving signal in accordance with the signal potential written in the storage capacitor C1 to the light emitting element EL so that the light emitting element EL emits light.

As a characteristic matter of an embodiment of the present invention, the signal selector or horizontal selector variably adjusts the first timing t1, that is, the changeover phase of the driving signal, in response to the level or gradation of the signal potential Vsig thereby to variably control the signal write period (6) from the first timing t1 to the second timing t2 in response to the signal potential Vsig. In particular, when the signal potential Vsig has the white level, the signal selector displaces the first timing t1 toward the second timing t2 to shorten the writing period (6), but when the signal potential Vsig has the black level, the signal selector displaces the first timing t1 away from the second timing t2 to elongate the writing period (6). Within the writing period (6), the driving transistor T2 negatively feeds back driving current flowing therethrough within the writing period (6) to the storage capacitor C1 to carry out a correction operation for the mobility μ of the driving transistor T2. The signal selector variably adjusts the writing period (6) in response to the level of the signal potential Vsig to optimize the negative feedback amount as described above. Phase adjustment of the changeover timing in accordance with the signal level or luminance gradation can be implemented by a level/phase conversion circuit of a comparative simple configuration, and a complicated external module is not required.

Figure 15B:
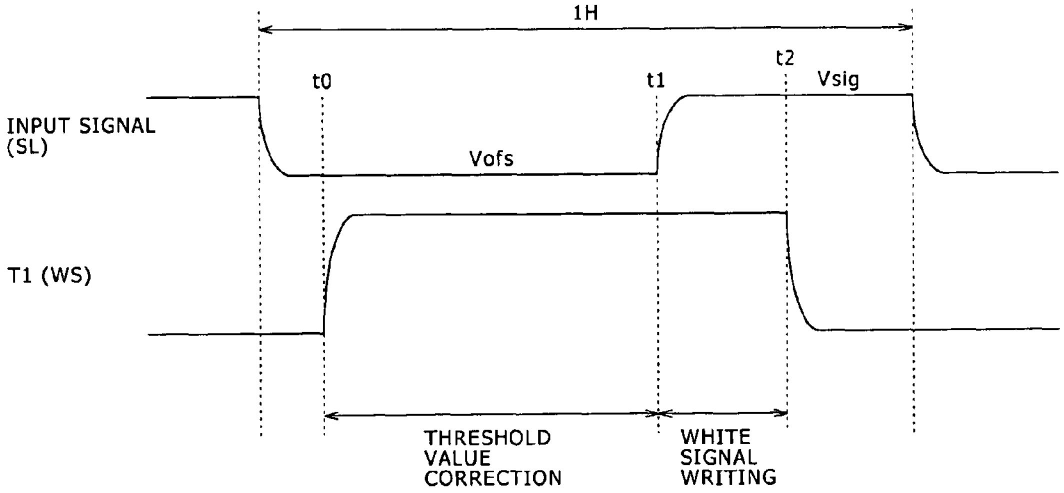
FIGS. 15B and 15C are timing charts illustrating a driving method for the display apparatus of FIG. 1.

FIG. 15B illustrates an operation state where white display is carried out. The input signal supplied to the signal line SL changes over from the reference potential Vofs to the signal potential Vsig within a period of 1 H. The timing of this changeover is represented by t1. The sampling transistor T1 is placed into an on state in response to a control signal pulse applied to the scanning line WS. This timing at which the sampling transistor T1 is placed into an on state is represented by t0. When the input signal is the reference potential Vofs, the sampling transistor T1 exhibits an on state and carries out a threshold value correction operation. Thereafter, at timing t1, the input signal changes over to the signal potential Vsig and enters a writing operation of a white signal. Simultaneously, mobility correction corresponding to the white signal is started. After the input signal changes over to the signal potential Vsig at timing t1, the sampling transistor T1 is placed into an off state at timing t2, thereby completing the white signal writing operation. In such an operation sequence as just described, the timing t1 at which the input signal changes over from the reference potential Vofs to the signal potential Vsig is displaced relatively toward the driving transistor T2. Consequently, the white signal writing time is shortened, and the mobility correction time is optimized in accordance with the white level. In other words, when a white signal is inputted, the signal phase of the input signal is delayed to shorten the signal writing time period.

Figure 15C:
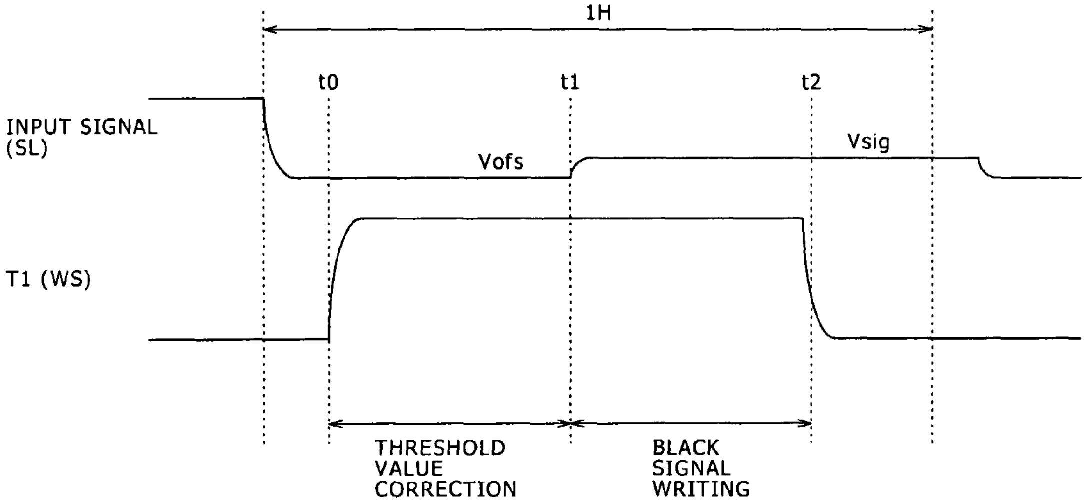

FIG. 15C illustrates an operation state upon black signal writing. The input signal changes over from the reference potential Vofs to the signal potential Vsig at timing t1. Since the black is displayed, the level of the signal potential Vsig is lower than the level upon the white display illustrated in FIG. 15B. Correspondingly, the timing t1 at which the input signal changes over from the reference potential Vofs to the signal potential Vsig is displaced away from the timing t2. In other words, the black signal writing period can be elongated by advancing the signal phase of the input signal. In this manner, in the embodiment of the present invention, the signal writing period is defined by the timing t1 at which the signal rises and the timing t2 at which the sampling transistor T1 is placed into an off state and varies the falling edge phase t1 of the signal in response to the level of the image signal inputted to the pixel. Consequently, it becomes possible to make a correction against unevenness arising from the mobility over all gradations, and uniform picture quality free from stripes or unevenness can be obtained. Further, according to the embodiment of the present invention, since the necessity to input an analog waveform from an external module to a write scanner is eliminated, reduction in power consumption and cost can be achieved.

Figure 15D:
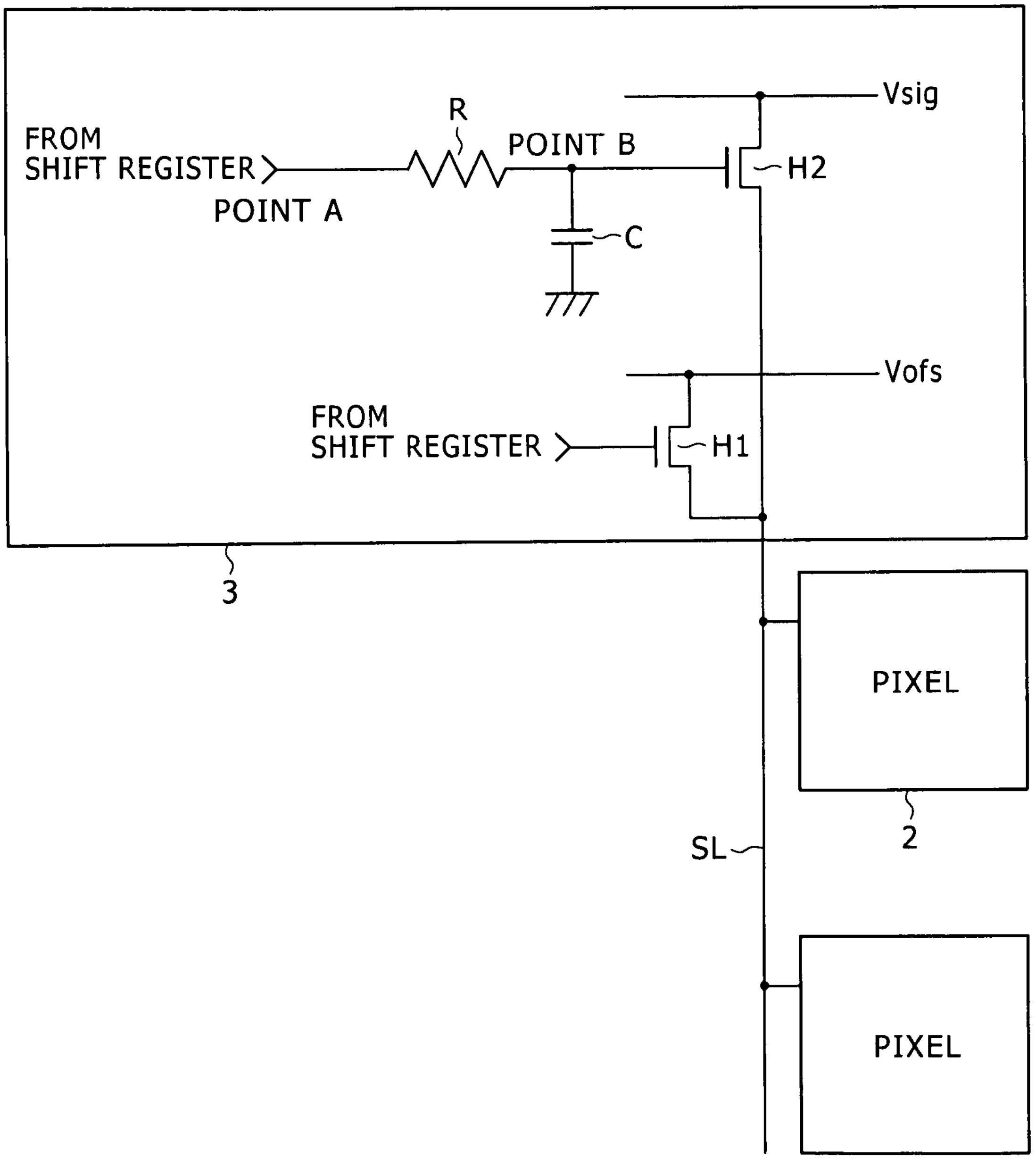
FIG. 15D is a circuit diagram showing a form of an outputting section of a horizontal selector of the display apparatus of FIG. 1.

FIG. 15D shows the outputting section of the horizontal selector 3 corresponding to a signal line SL for one column. Though not shown, the horizontal selector 3 includes, in addition to the outputting section, a signal processing section for supplying a signal voltage Vsig and a reference potential Vofs to the outputting section, and a shift register for supplying a control signal to the outputting section in synchronism with line sequential scanning of the write scanner side.

The outputting section of the horizontal selector 3 is composed of transistors H1 and H2, a resistor R, and a capacitor C. The transistor H1 is for outputting a reference potential Vofs and is connected at a pair of current terminals thereof to a supply line of the reference potential Vofs and a signal line SL. The transistor H2 is for outputting a signal potential Vsig and is connected at a pair of current electrodes thereof to the supply line of the signal potential Vsig and the signal line SL and at a control terminal or point B thereof to a corresponding point or point A of the shift register. An RC circuit formed from the resistor R and the capacitor C is inserted between the point A and the point B.

Figure 15E:
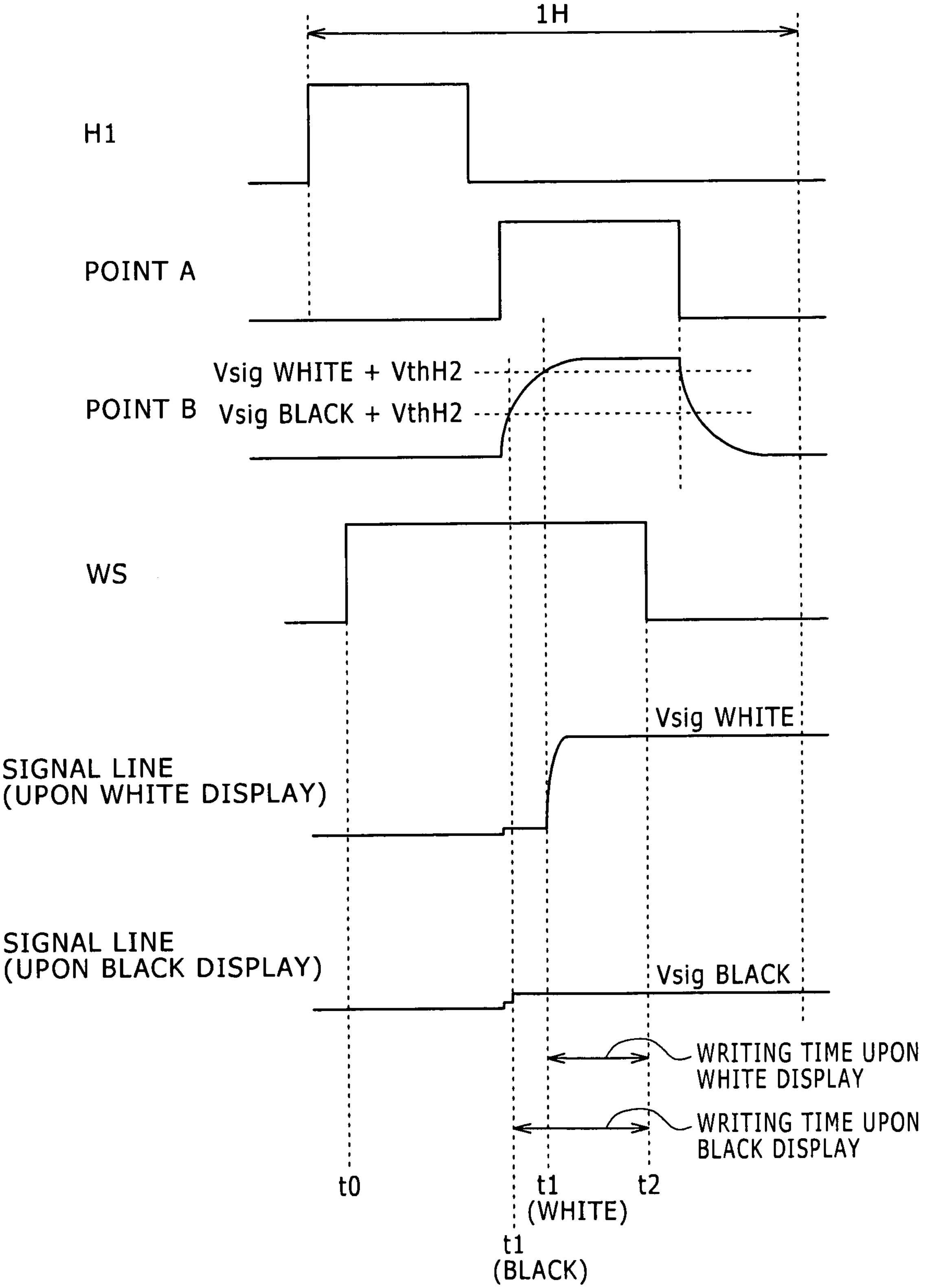
FIG. 15E is a timing chart illustrating operation of the horizontal selector shown in FIG. 15D.

FIG. 15E illustrates operation of the horizontal selector 3 shown in FIG. 15D. Referring to FIG. 15E, a control pulse of a rectangular shape is applied from the shift register to the control terminal of the transistor H1 within a front half of one horizontal scanning period of 1 H. Consequently, the transistor H1 is placed into an on state to output the reference potential Vofs to the corresponding signal line SL.

Then, after the rear half of the one horizontal scanning period of 1 H is entered, a control pulse of a rectangular shape is applied from the shifter register to the point A. This control pulse comes to the point B which is the control terminal of the transistor H2 through the RC circuit. The rectangular pulse is deformed in accordance with the time constant of the RC circuit and exhibits such a rising edge waveform and a falling edge waveform as seen in FIG. 15E. Since the pulse waveform is deformed, the rising edge form successively passes a level (Vsig black+VthH2) obtained by adding the signal potential Vsig black upon black display and the threshold voltage VthH2 of the transistor H2 and another level (Vsig white+VthH2) obtained by adding the signal potential Vsig white upon white display and the threshold voltage VthH2 of the transistor H2. It is to be noted that, at this point of time, the control signal WS was already applied to the scanning line WS at timing t0, and the sampling transistor on the pixel 2 side is in an on state.

In the case of white display, the transistor H2 is placed into an on state at timing t1 (white) at which the potential at the point B exceeds Vsig white+VthH2. In particular, since the current terminal of the transistor H2 connected to the signal supply line side acts as the source and the point B acts as the gate, when the gate-source voltage exceeds (Vsig white+VthH2)−Vsig white=VthH2, the transistor H2 is placed into an on state. Consequently, the signal potential Vsig white for white display is applied from the signal supply line to the signal line SL. In particular, the potential of the signal line SL changes over from the reference potential Vofs to the signal potential Vsig white at timing t1 (white).

In the case of black display, the transistor H2 is placed into an on state at timing t1 (black) at which the potential at the point B exceeds Vsig black+VthH2. In particular, since the current terminal of the transistor H2 connected to the signal supply line side acts as the source and the point B acts as the gate, when the gate-source voltage exceeds (Vsig black+VthH2)−Vsig black=VthH2, the transistor H2 is placed into an on state. Consequently, the signal potential Vsig black for black display is applied from the signal supply line to the signal line SL. In particular, the potential of the signal line SL changes over from the reference potential Vofs to the signal potential Vsig black at timing t1 (black). As can be seen apparently from the timing chart, the timing t1 (black) is shifted forwardly in time from the timing t1 (white). In other words, the horizontal selector 3 variably controls the first timing t1 in response to the level of the signal potential Vsig.

Thereafter, when the second timing t2 comes, the control signal WS is canceled, and the sampling transistor on the pixel 2 side is placed into an off state. Consequently, the sampling of the signal potential Vsig ends. As a result, the signal writing time period upon white display is from timing t1 (white) to timing t2, and the signal writing time period upon black display is from timing t1 (black) to timing t2. In this manner, when the signal potential has the white level, the horizontal selector 3 displaces the first timing t1 (white) toward the second timing t2 to shorten the writing time, but when the signal potential has the black level, the horizontal selector 3 displaces the first timing t1 (black) away from the second timing t2 to elongate the writing time.

Figure 16:
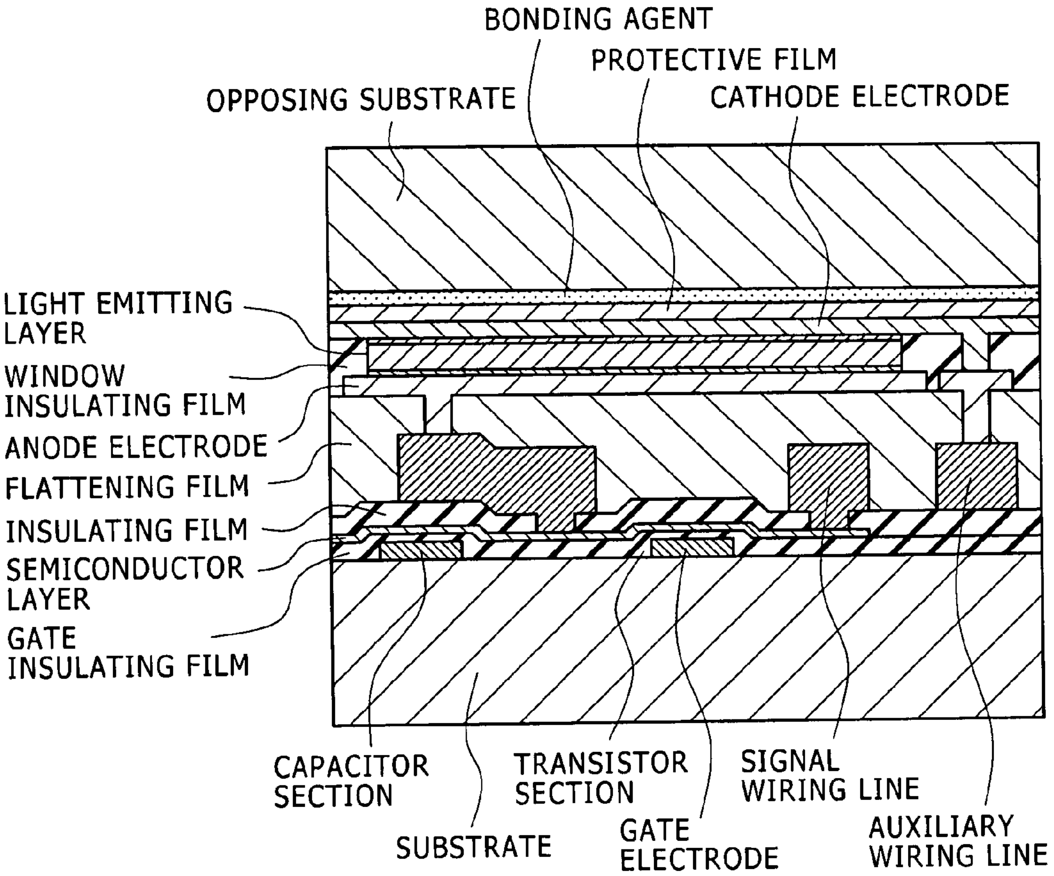
FIG. 16 is a sectional view showing a configuration of the display apparatus of FIG. 1.

The display apparatus according to the present invention has such a thin film device configuration as shown in FIG. 16. FIG. 16 shows a schematic sectional structure of a pixel formed on an insulating substrate. As seen in FIG. 16, the pixel shown includes a transistor section (in FIG. 16, one TFT is illustrated) including a plurality of thin film transistors, a capacitor section such as a storage capacitor or the like, and a light emitting section such as an organic EL element. The transistor section and the capacitor section are formed on the substrate by a TFT process, and the light emitting section such as an organic EL element is laminated on the transistor section and the capacitor section. A transparent opposing substrate is adhered to the light emitting section by a bonding agent to form a flat panel.

Figure 17:
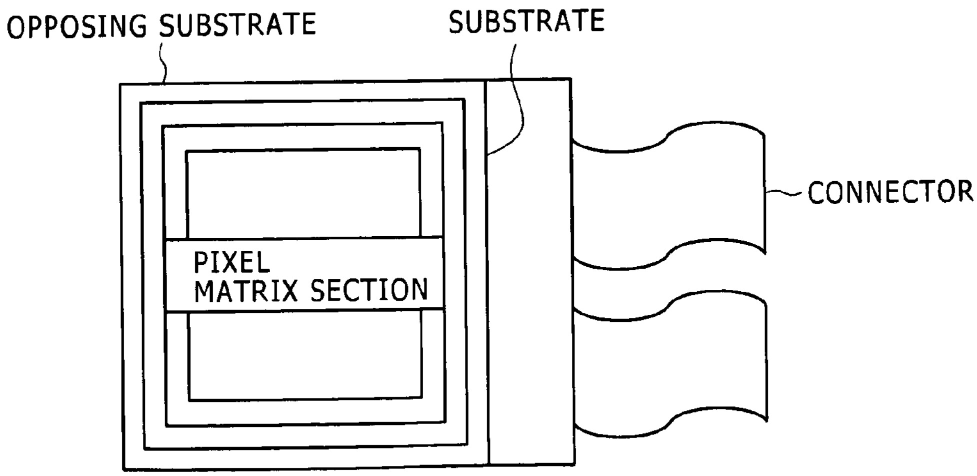
FIG. 17 is a plan view showing a module configuration of the display apparatus of FIG. 1.

The display apparatus of the present embodiment includes such a display apparatus of a module type of a flat shape as seen in FIG. 17. Referring to FIG. 17, a display array section wherein a plurality of pixels each including an organic EL element, a thin film transistor, a thin film capacitor and so forth are formed and integrated in a matrix, for example, on an insulating substrate. A bonding agent is disposed in such a manner as to surround the pixel array section or pixel matrix section, and an opposing substrate of glass or the like is adhered to form a display module. As occasion demands, a color filter, a protective film, a light intercepting film and so forth may be provided on this transparent opposing substrate. As a connector for inputting and outputting signals and so forth from the outside to the pixel array section and vice versa, for example, a flexible printed circuit (FPC) may be provided on the display module.

The display apparatus according to the present invention described above has a form of a flat panel and can be applied as a display apparatus of various electric apparatus in various fields wherein an image signal inputted to or produced in the electronic apparatus is displayed as an image, such as, for example, digital cameras, notebook type personal computers, portable telephone sets and video cameras. In the following, examples of the electronic apparatus to which the display apparatus is applied are described.

Figure 18:
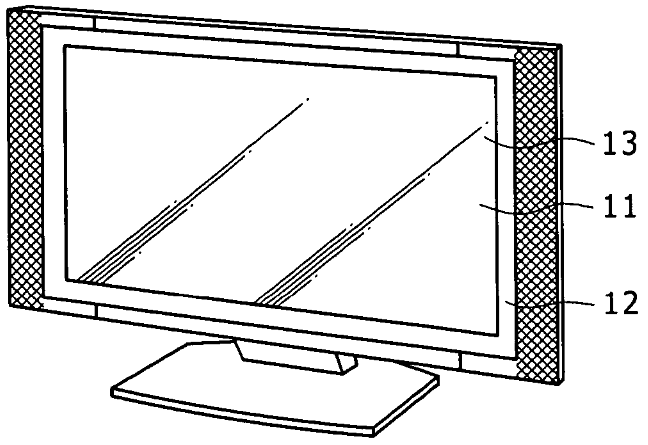
FIG. 18 is a perspective view showing a television set which includes the display apparatus shown in FIG. 1.

FIG. 18 shows a television set to which the present invention is applied. Referring to FIG. 18, the television set includes a front panel 12 and an image display screen 11 formed from a filter glass plate 3 and so forth and is produced using the display apparatus of the present invention as the image display screen 11.

Figure 19:
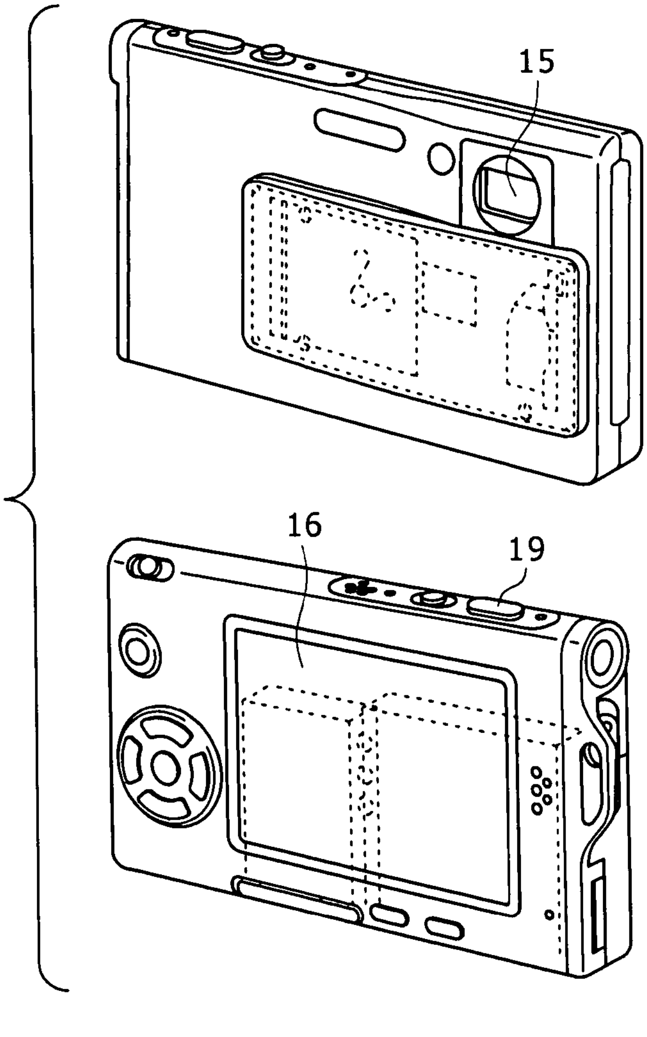
FIG. 19 is perspective views showing a digital still camera which includes the display apparatus shown in FIG. 1.

FIG. 19 shows a digital camera to which the present invention is applied. Referring to FIG. 19, a front elevational view of the digital camera is shown on the upper side, and a rear elevational view of the digital camera is shown on the lower side. The digital camera shown includes an image pickup lens, a flash light emitting section 15, a display section 16, a control switch, a menu switch, a shutter 19 and so forth. The digital camera is produced using the display apparatus of the present invention as the display section 16.

Figure 20:
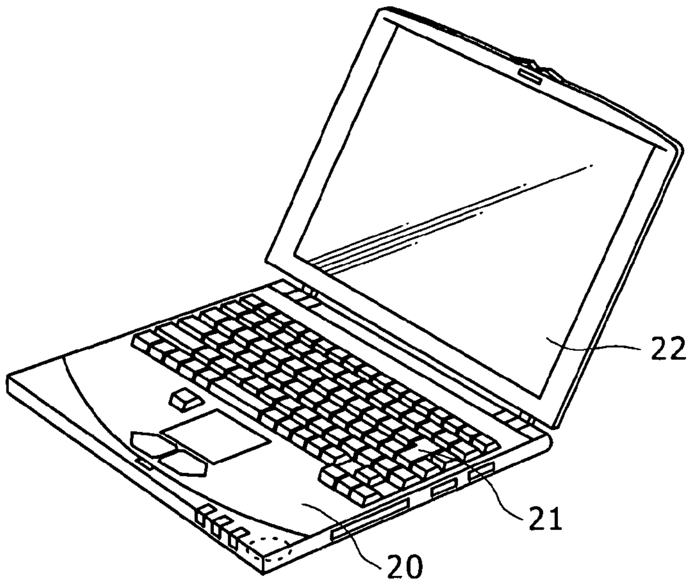
FIG. 20 is a perspective view showing a notebook type personal computer which includes the display apparatus shown in FIG. 1.

FIG. 20 shows a notebook type personal computer to which the present invention is applied. Referring to FIG. 20, the notebook type personal computer shown includes a body 20, a keyboard 21 for being operated in order to input characters and so forth, a display section 22 provided on a body cover for displaying an image and so forth. The notebook type personal computer is produced using the display apparatus of the present invention as the display section 22.

Figure 21:
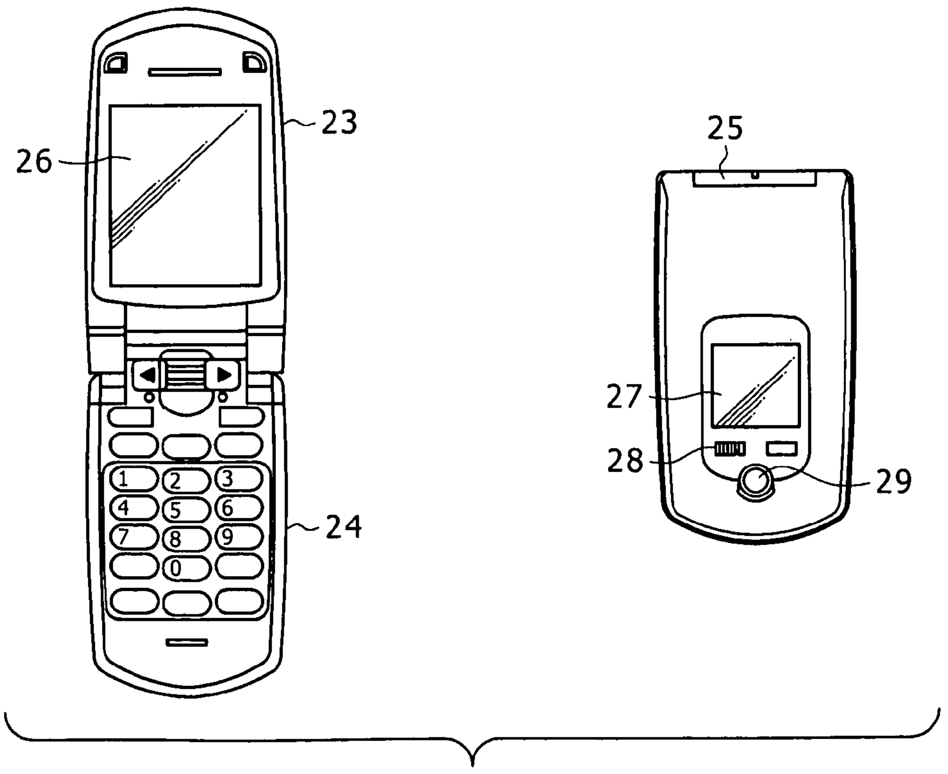
FIG. 21 is a schematic view showing a portable terminal apparatus which includes the display apparatus shown in FIG. 1.

FIG. 21 shows a portable terminal apparatus to which the present invention is applied. Referring to FIG. 21, the portable terminal apparatus is shown in an unfolded state on the left side and shown in a folded state on the right side. The portable terminal apparatus includes an upper side housing 23, a lower side housing 24, a connection section 25 in the form of a hinge section, a display section 26, a sub display section 27, a picture light 28, a camera 29 and so forth. The portable terminal apparatus is produced using the display apparatus of the present invention as the sub display section 27.

Figure 22:
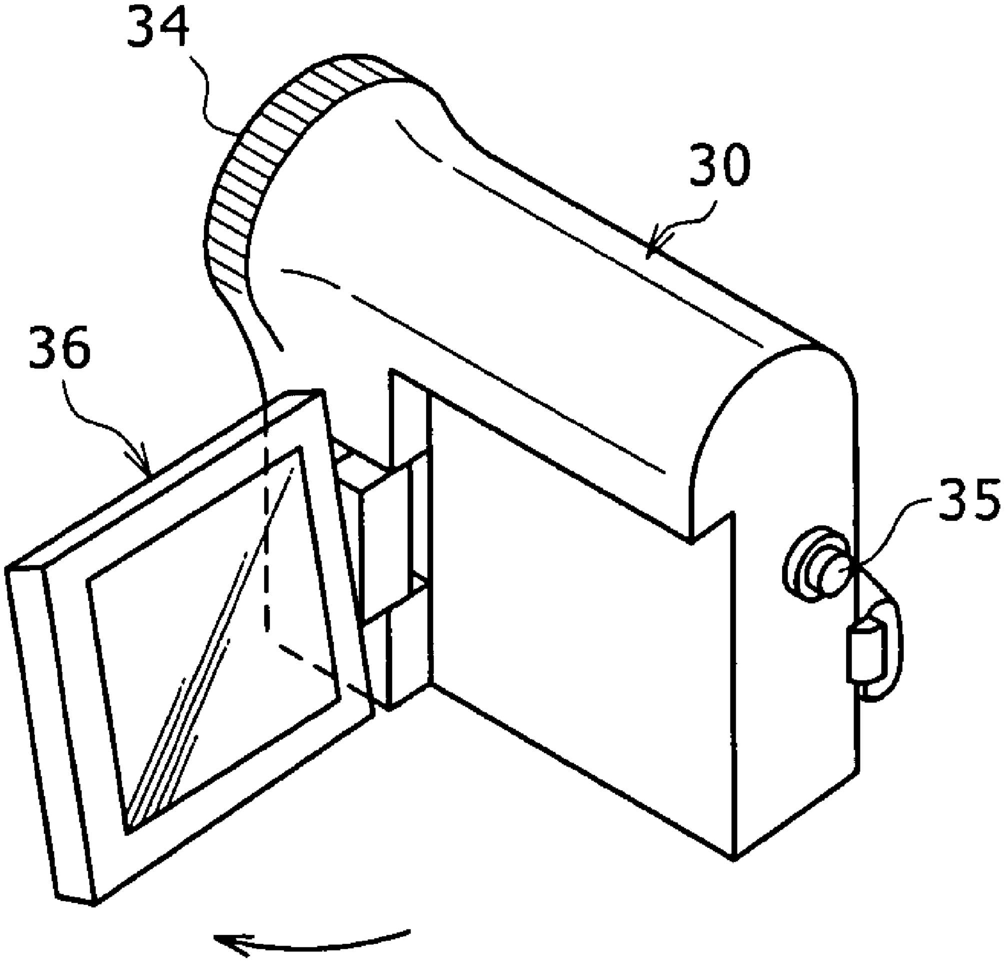
FIG. 22 is a perspective view showing a video camera which includes the display apparatus shown in FIG. 1.
Figure 23:
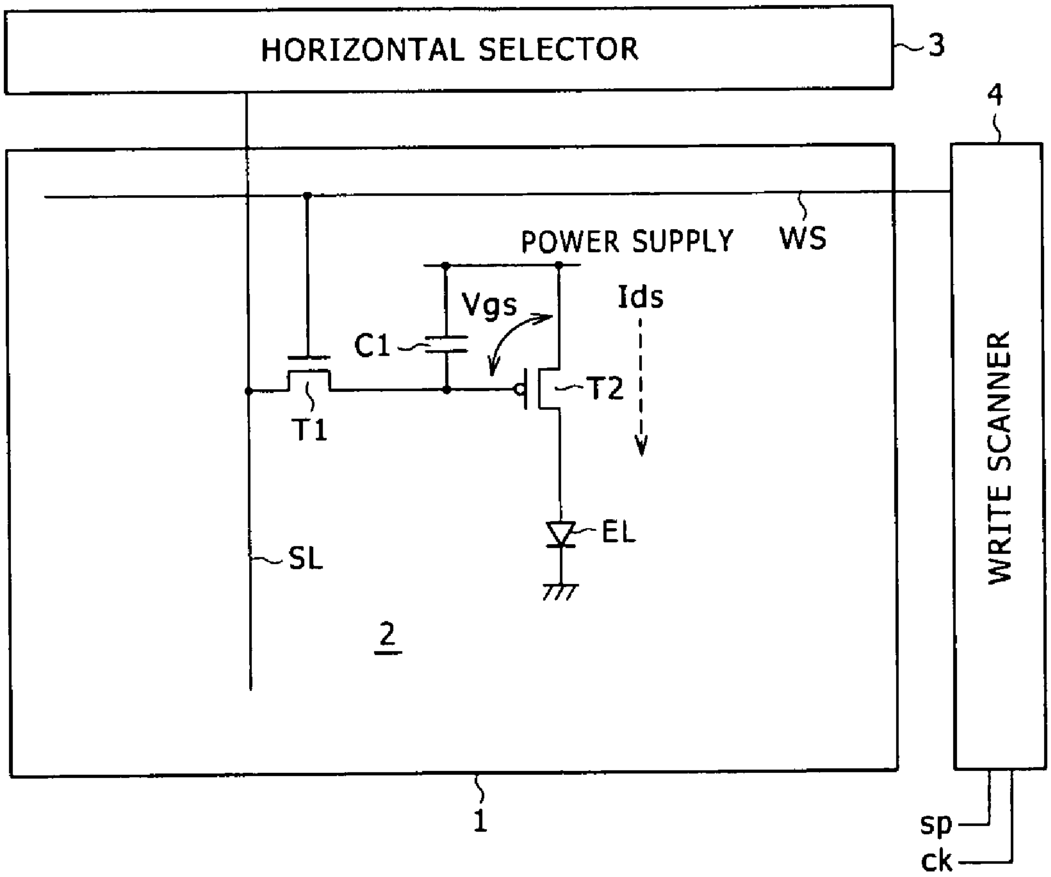
FIG. 23 is a circuit diagram showing an example of an existing display apparatus.
Figure 24:
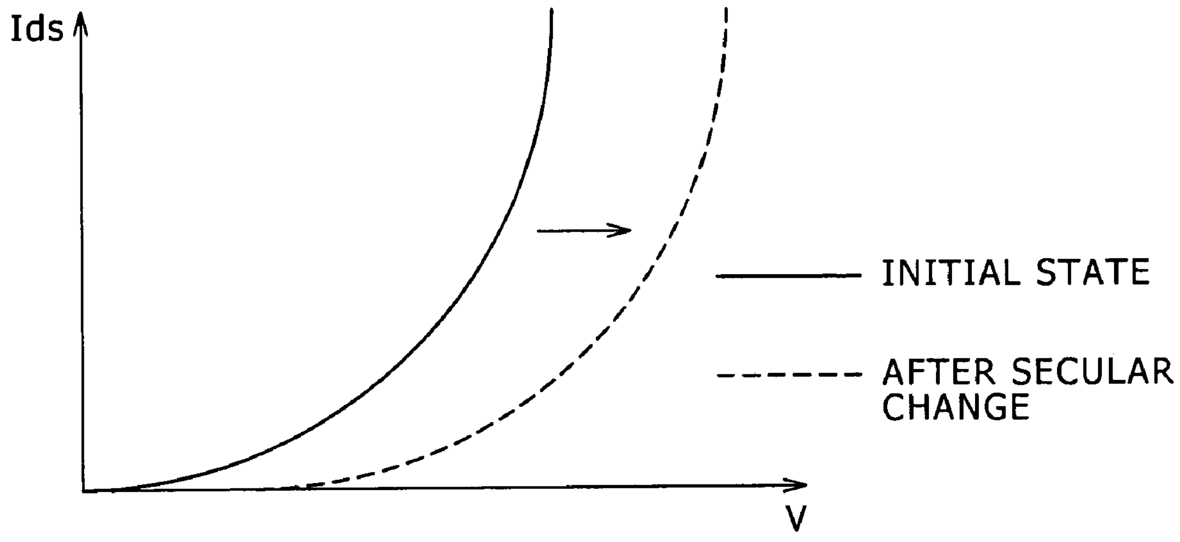
FIG. 24 is a graph illustrating a problem of the existing display apparatus of FIG. 23.
Figure 25:
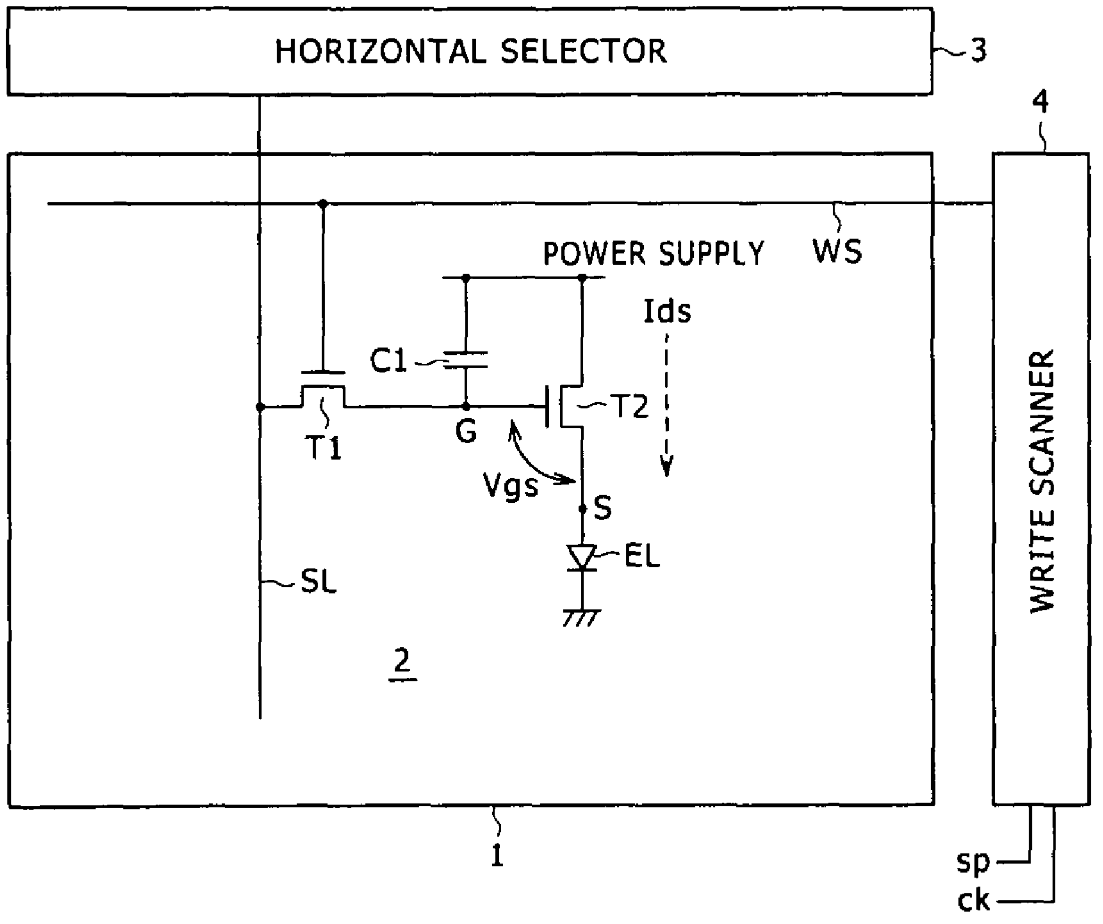
FIG. 25 is a circuit diagram showing another example of an existing display apparatus.

FIG. 22 shows a video camera to which the present invention is applied. Referring to FIG. 22, the video camera shown includes a body section 30, and a lens 34 for picking up an image of an image pickup object, a start/stop switch 35 for image pickup, a monitor 36 and so forth provided on a face of the body section 30 which is directed forwardly. The video camera is produced using the display apparatus of the present invention as the monitor 36.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:

a pixel array section; and a driving section;

the pixel array section including a plurality of scanning lines extending along the direction of a row, a plurality of signal lines extending along the direction of a column, and a plurality of pixels disposed in rows and columns at places at which the scanning lines and the signal lines intersect with each other;

each of the pixels including a sampling transistor, a driving transistor, a storage capacitor and a light emitting element;

the sampling transistor being connected at a control terminal thereof to an associated one of the scanning lines and at a pair of current terminals thereof to a first one of the signal lines and a control terminal of the driving transistor;

the driving transistor being connected at a first one of a pair of current terminals thereof to the light emitting element and at a second one of the current terminals thereof to a power supply;

the storage capacitor being connected to the control terminal of the driving transistor;

the driving section including a write scanner and a signal selector;

the write scanner supplying sequential control signals to the scanning lines for each horizontal period;

the signal selector supplying image signals, wherein a signal potential and a reference potential change over for each horizontal period, to the signal lines;

the sampling transistor being placed into an on state in response to a control signal supplied to an associated one of the scanning lines when an associated one of the signal lines has the reference potential to carry out a threshold voltage correction operation of canceling a dispersion of the threshold voltage of the driving transistor;

the sampling transistor carrying out a signal writing operation of writing, within a writing period from a first timing at which the potential of the associated signal line changes over from the reference potential to the signal potential to a second timing at which the sampling transistor is placed into an off state in response to the control signal, the signal potential into the storage capacitor;

the driving transistor supplying driving current in accordance with the signal potential written in the storage capacitor to the light emitting element so as to carry out a light emitting operation;

the signal selector variably adjusting the first timing in response to the signal potential thereby to variably control the writing period from the first timing to the second timing in response to the signal potential.

2. The display apparatus according to claim 1, wherein, when the signal potential has a white level, the signal selector displaces the first timing toward the second timing to shorten the writing period, but when the signal potential has a black level, the signal selector displaces the first timing away from the second timing to elongate the writing period.

3. The display apparatus according to claim 2, wherein the storage capacitor is connected between the control terminal and one of the current terminals of the driving transistor, and the driving transistor negatively feeds back driving current flowing therethrough during the writing period to the storage capacitor to carry out a correction operation against a dispersion of the mobility of the driving transistor whereas the signal selector variably adjusts the writing period in response to the signal potential to optimize the negative feedback amount.

4. A driving method for a display apparatus which includes a pixel array section and a driving section, the pixel array section including a plurality of scanning lines extending along the direction of a row, a plurality of signal lines extending along the direction of a column, and a plurality of pixels disposed in rows and columns at places at which the scanning lines and the signal lines intersect with each other, each of the pixels including a sampling transistor, a driving transistor, a storage capacitor and a light emitting element, the sampling transistor being connected at a control terminal thereof to an associated one of the scanning lines and at a pair of current terminals thereof to a first one of the signal lines and a control terminal of the driving transistor, the driving transistor being connected at a first one of a pair of current terminals thereof to the light emitting element and at a second one of the current terminals thereof to a power supply, the storage capacitor being connected to the control terminal of the driving transistor, the driving section including a write scanner and a signal selector, the write scanner supplying sequential control signals to the scanning lines for each horizontal period, the signal selector supplying image signals, wherein a signal potential and a reference potential change over for each horizontal period, to the signal lines, the driving method comprising the steps of:

placing the sampling transistor into an on state in response to a control signal supplied to an associated one of the scanning lines when an associated one of the signal lines has the reference potential to carry out a threshold voltage correction operation of canceling a dispersion of the threshold voltage of the driving transistor;

carrying out a signal writing operation of writing, within a writing period from a first timing at which the potential of the associated signal line changes over from the reference potential to the signal potential to a second timing at which the sampling transistor is placed into an off state in response to the control signal, the signal potential into the storage capacitor;

supplying driving current in accordance with the signal potential written in the storage capacitor from the driving transistor supplying to the light emitting element so as to carry out a light emitting operation; and variably adjusting the first timing in response to the signal potential thereby to variably control the writing period from the first timing to the second timing in response to the signal potential.

5. An electronic apparatus, comprising:

a display apparatus including; a pixel array section and a driving section;

the pixel array section including a plurality of scanning lines extending along the direction of a row, a plurality of signal lines extending along the direction of a column, and a plurality of pixels disposed in rows and columns at places at which the scanning lines and the signal lines intersect with each other;

each of the pixels including a sampling transistor, a driving transistor, a storage capacitor and a light emitting element;

the sampling transistor being connected at a control terminal thereof to an associated one of the scanning lines and at a pair of current terminals thereof to a first one of the signal lines and a control terminal of the driving transistor;

the driving transistor being connected at a first one of a pair of current terminals thereof to the light emitting element and at a second one of the current terminals thereof to a power supply;

the storage capacitor being connected to the control terminal of the driving transistor;

the driving section including a write scanner and a signal selector;

the write scanner supplying sequential control signals to the scanning lines for each horizontal period;

the signal selector supplying image signals, wherein a signal potential and a reference potential change over for each horizontal period, to the signal lines;

the sampling transistor being placed into an on state in response to a control signal supplied to an associated one of the scanning lines when an associated one of the signal lines has the reference potential to carry out a threshold voltage correction operation of canceling a dispersion of the threshold voltage of the driving transistor;

the sampling transistor carrying out a signal writing operation of writing, within a writing period from a first timing at which the potential of the associated signal line changes over from the reference potential to the signal potential to a second timing at which the sampling transistor is placed into an off state in response to the control signal, the signal potential into the storage capacitor;

the driving transistor supplying driving current in accordance with the signal potential written in the storage capacitor to the light emitting element so as to carry out a light emitting operation;

the signal selector variably adjusting the first timing in response to the signal potential thereby to variably control the writing period from the first timing to the second timing in response to the signal potential.

6. A display apparatus, comprising:

a pixel array section including
- a plurality of scanning lines;
- a plurality of signal lines; and
- a plurality of pixels; and a driving section including
- a write scanner and a signal selector, each of said plurality of pixels comprising:
- a sampling transistor;
- a driving transistor;
- a storage capacitor; and a light emitting element, the write scanner supplying a control signal sequentially to the plurality of scanning lines, the signal selector supplying a signal potential and a reference potential to the plurality of signal lines, the sampling transistor writing the signal potential into the storage capacitor, within a writing period from a first timing at which the potential of one of the plurality of signal lines changes from the reference potential to the signal potential to a second timing where the sampling transistor is switched to an OFF state in response to the control signal, the driving transistor supplying driving current in accordance with the signal potential written in the storage capacitor to the light emitting element, and the signal selector variably adjusting the first timing in response to the signal potential.

7. A driving method for a display apparatus which includes a pixel array section including a plurality of scanning lines, a plurality of signal lines, and a plurality of pixels, and a driving section including a write scanner and a signal selector, each of said plurality of pixels comprising a sampling transistor, a driving transistor, a storage capacitor, and a light emitting element, the driving method comprising the steps of:

supplying, by the write scanner, a control signal sequentially to the plurality of scanning lines;

providing, by the signal selector, a signal potential and a reference potential to the plurality of signal lines;

writing the signal potential into the storage capacitor, within a writing period from a first timing at which the potential of one of the plurality of signal lines changes from the reference potential to the signal potential to a second timing where the sampling transistor is switched to an OFF state in response to the control signal, supplying, by the driving transistor, driving current in accordance with the signal potential written in the storage capacitor to the light emitting element; and variably adjusting the first timing in response to the signal potential in the signal selector.

8. An electronic apparatus comprising the display apparatus according to claim 6.

* * * * *